US012790216B2

(12) United States Patent
Hikata et al.

(10) Patent No.: US 12,790,216 B2
(45) Date of Patent: Nov. 10, 2026

(54) METHOD AND APPARATUS FOR MANUFACTURING CARBON NANOTUBE ASSEMBLED WIRE

(71) Applicants: SUMITOMO ELECTRIC INDUSTRIES, LTD., Osaka (JP); UNIVERSITY OF TSUKUBA, Tsukuba (JP)

(72) Inventors: Takeshi Hikata, Osaka (JP); Toshihiko Fujimori, Osaka (JP); Daiji Yamashita, Osaka (JP); Soichiro Okubo, Osaka (JP); Takamasa Onoki, Osaka (JP); Jun-ichi Fujita, Tsukuba (JP)

(73) Assignees: SUMITOMO ELECTRIC INDUSTRIES, LTD., Osaka (JP); UNIVERSITY OF TSUKUBA, Tsukuba (JP)

( * ) Notice: Subject to any disclaimer, the term of this patent is extended or adjusted under 35 U.S.C. 154(b) by 619 days.

(21) Appl. No.: 18/277,855

(22) PCT Filed: Feb. 24, 2022

(86) PCT No.: PCT/JP2022/007606
§ 371 (c)(1),
(2) Date: Aug. 18, 2023

(87) PCT Pub. No.: WO2022/181692
PCT Pub. Date: Sep. 1, 2022

(65) Prior Publication Data

US 2024/0308853 A1 Sep. 19, 2024

(30) Foreign Application Priority Data

Feb. 25, 2021 (JP) ................................ 2021-028388

(51) Int. Cl.
*C01B 32/168* (2017.01)
*D01F 9/133* (2006.01)

(52) U.S. Cl.
CPC ............ *C01B 32/168* (2017.08); *D01F 9/133* (2013.01); *C01B 2202/34* (2013.01); *C01B 2202/36* (2013.01)

(58) Field of Classification Search
CPC .............. C01B 32/168; C01B 2202/34; C01B 2202/36; C01B 32/158; C01B 32/16;
(Continued)

(56) References Cited

U.S. PATENT DOCUMENTS

2005/0170089 A1* 8/2005 Lashmore .............. B82Y 10/00 977/843
2021/0163252 A1 6/2021 Li et al.
(Continued)

FOREIGN PATENT DOCUMENTS

WO 2019/183767 A1 10/2019
WO 2020/138378 A1 7/2020
(Continued)

OTHER PUBLICATIONS

Apr. 26, 2022 International Search Report issued in International Patent Application No. PCT/JP2022/007606.

*Primary Examiner* — Daniel C. Mccracken
(74) *Attorney, Agent, or Firm* — Oliff PLC

(57) ABSTRACT

A method for manufacturing a carbon nanotube assembled wire includes: a first step of supplying a carbon-containing gas to a plurality of catalyst particles in a suspended state in a tubular carbon nanotube synthesis furnace to grow a carbon nanotube from each of the plurality of catalyst particles to obtain a plurality of carbon nanotubes; and a
(Continued)

second step of assembling the plurality of carbon nanotubes together to obtain a plurality of carbon nanotube assembled wires.

8 Claims, 6 Drawing Sheets

(58) Field of Classification Search
CPC ... C01B 32/162; C01B 32/164; C01B 32/159; C01B 32/166; C01B 32/17; C01B 32/172; C01B 32/174; C01B 32/176; C01B 32/178; C01B 2202/00; C01B 2202/02; C01B 2202/04; C01B 2202/06; C01B 2202/08; C01B 2202/10; C01B 2202/20; C01B 2202/22; C01B 2202/24; C01B 2202/26; C01B 2202/28; C01B 2202/30; C01B 2202/32; D01F 9/133; D01F 9/127; D01F 9/12; D01F 9/1271; D01F 9/1272; D01F 9/1273; D01F 9/1274; D01F 9/1275; D01F 9/1276; D01F 9/1277; D01F 9/1278; B01J 23/745; B01J 27/04; B82Y 40/00
See application file for complete search history.

(56) References Cited

U.S. PATENT DOCUMENTS

| | | | | |
|---|---|---|---|---|
| 2022/0064002 | A1* | 3/2022 | Fujimori | C01B 32/164 |
| 2022/0064003 | A1* | 3/2022 | Fujimori | D01F 9/127 |
| 2022/0153585 | A1* | 5/2022 | Hikata | C01B 32/16 |
| 2022/0315427 | A1 | 10/2022 | Hikata et al. | |
| 2022/0341065 | A1 | 10/2022 | Fujimori et al. | |

FOREIGN PATENT DOCUMENTS

| | | | | | |
|---|---|---|---|---|---|
| WO | 2020/138379 | A1 | 7/2020 | | |
| WO | WO 2020/138378 | * | 7/2020 | | C01B 32/162 |
| WO | WO 2020/138379 | * | 7/2020 | | C01B 32/158 |
| WO | 2020/171047 | A1 | 8/2020 | | |
| WO | WO 2020/171047 | * | 8/2020 | | C01B 32/16 |
| WO | 2021/044963 | A1 | 3/2021 | | |
| WO | 2021/044964 | A1 | 3/2021 | | |

* cited by examiner

METHOD AND APPARATUS FOR MANUFACTURING CARBON NANOTUBE ASSEMBLED WIRE

TECHNICAL FIELD

The present disclosure relates to a method and apparatus for manufacturing a carbon nanotube assembled wire. The present application claims priority based on Japanese Patent Application No. 2021-028388 filed on Feb. 25, 2021. The entire contents of the description in this Japanese patent application are incorporated herein by reference.

BACKGROUND ART

A carbon nanotube (hereinafter also referred to as "CNT") composed of a cylindrical graphene sheet made of carbon atoms bonded in a hexagonal pattern is a material having a weight that is one fifth of that of copper, a strength that is 20 times that of steel, and excellent conductivity. Thus, an electric wire using the carbon nanotube is expected as a material contributing to decreased weight and size and improved corrosion resistance of motors for automobiles in particular.

Currently manufactured carbon nanotubes have a diameter of about 0.4 nm to 20 nm and a maximum length of about 55 cm. In order to use a carbon nanotube as an electric wire, a high strength material and the like, the carbon nanotube needs to be longer wire, and accordingly, techniques using carbon nanotubes to obtain elongated wire have been studied.

For example, International Publication No. 2020/138378 (PTL 1) discloses a method for obtaining an elongated carbon nanotube assembled wire by orientating a plurality of carbon nanotubes in their longitudinal direction and thus assembling them together.

CITATION LIST

Patent Literature

PTL 1: WO 2020/138378

SUMMARY OF INVENTION

The presently disclosed method for manufacturing a carbon nanotube assembled wire comprises:

- a first step of supplying a carbon-containing gas to a plurality of catalyst particles in a suspended state in a tubular carbon nanotube synthesis furnace to grow a carbon nanotube from each of the plurality of catalyst particles to obtain a plurality of carbon nanotubes; and
- a second step of assembling the plurality of carbon nanotubes together to obtain a plurality of carbon nanotube assembled wires, the second step including
- a second A step of orienting a first carbon nanotube group composed of some of the plurality of carbon nanotubes in a longitudinal direction of the carbon nanotubes in a first channel and thus assembling the first carbon nanotube group to obtain a first carbon nanotube assembled wire, and
- a second B step of orienting a second carbon nanotube group composed of some of the plurality of carbon nanotubes different from the plurality of carbon nanotubes composing the first carbon nanotube group in a longitudinal direction of the carbon nanotubes in a second channel and thus assembling the second carbon nanotube group to obtain a second carbon nanotube assembled wire.

An apparatus for manufacturing a carbon nanotube assembled wire comprises:

- a tubular carbon nanotube synthesis furnace;
- a carbon-containing gas supply port provided on one end side of the carbon nanotube synthesis furnace; and
- a first channel and a second channel provided on an end side of the carbon nanotube synthesis furnace opposite to the end provided with the carbon-containing gas supply port; wherein
- the first channel and the second channel are provided in parallel in a longitudinal direction of the carbon nanotube synthesis furnace and
- the first channel and the second channel each have an area in cross section smaller than that of the carbon nanotube synthesis furnace.

DETAILED DESCRIPTION

Figure 1:
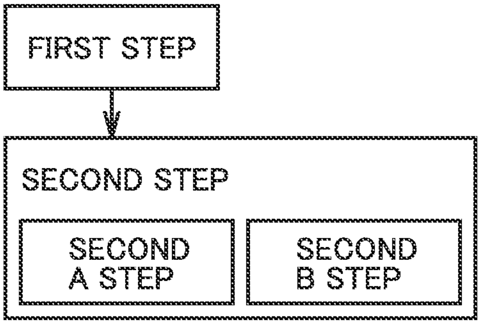
FIG. 1 is a flowchart of a method for manufacturing a carbon nanotube assembled wire according to a first embodiment.

Problem to be Solved by the Present Disclosure

The technique according to PTL 1 allows a single carbon nanotube assembled wire to be obtained from a single carbon nanotube synthesis furnace. In view of efficient production, however, there is a need for a technique for manufacturing a plurality of carbon nanotube assembled wires from a single carbon nanotube synthesis furnace.

Accordingly, one object is to provide a method for manufacturing a carbon nanotube assembled wire, that is capable of manufacturing a plurality of carbon nanotube assembled wires by a single carbon nanotube synthesis furnace.

Another object is to provide an apparatus for manufacturing a carbon nanotube assembled wire, that is capable of manufacturing a plurality of carbon nanotube assembled wires by a single carbon nanotube synthesis furnace.

Advantageous Effect of the Present Disclosure

According to the present disclosure, a plurality of carbon nanotube assembled wires can be manufactured by a single carbon nanotube synthesis furnace.

DESCRIPTION OF EMBODIMENTS OF THE PRESENT DISCLOSURE

First, embodiments of the present disclosure will be specified and described.

(1) The presently disclosed method for manufacturing a carbon nanotube assembled wire comprises:

- a first step of supplying a carbon-containing gas to a plurality of catalyst particles in a suspended state in a tubular carbon nanotube synthesis furnace to grow a carbon nanotube from each of the plurality of catalyst particles to obtain a plurality of carbon nanotubes; and
- a second step of assembling the plurality of carbon nanotubes together to obtain a plurality of carbon nanotube assembled wires, the second step including
- a second A step of orienting a first carbon nanotube group composed of some of the plurality of carbon nanotubes in a longitudinal direction of the carbon nanotubes in
- a first channel and thus assembling the first carbon nanotube group to obtain a first carbon nanotube assembled wire, and
- a second B step of orienting a second carbon nanotube group composed of some of the plurality of carbon nanotubes different from the plurality of carbon nanotubes composing the first carbon nanotube group in a longitudinal direction of the carbon nanotubes in a second channel and thus assembling the second carbon nanotube group to obtain a second carbon nanotube assembled wire.

According to the present disclosure, a plurality of carbon nanotube assembled wires can be manufactured by a single carbon nanotube synthesis furnace.

(2) Preferably, the first carbon nanotube group includes a first A carbon nanotube group composed of some of the plurality of carbon nanotubes composing the first carbon nanotube group, and a first a carbon nanotube group composed of some of the plurality of carbon nanotubes composing the first carbon nanotube group different from the plurality of carbon nanotubes composing the first A carbon nanotube group,

- the first channel includes a first-1A channel and a first-1a channel provided in parallel in a longitudinal direction of the carbon nanotube synthesis furnace, and a first-2 channel provided downstream of the first-1A channel and the first-1a channel as seen along a flow of the carbon-containing gas,
- the second A step includes
  - a second A-1A step of orienting the first A carbon nanotube group in the first-1A channel in a longitudinal direction of the carbon nanotubes and thus assembling the group to obtain a first A carbon nanotube assembled elemental wire,
  - a second A-1a step of orienting the first a carbon nanotube group in the first-1a channel in the longitudinal direction of the carbon nanotubes and thus assembling the group to obtain a first a carbon nanotube assembled elemental wire, and
  - a second A-2 step of orienting a plurality of carbon nanotube assembled elemental wires including the first A carbon nanotube assembled elemental wire and the first a carbon nanotube assembled elemental wire in the first-2 channel in a longitudinal direction of the carbon nanotube assembled elemental wires and thus assembling the plurality of carbon nanotube assembled elemental wires together to obtain the first carbon nanotube assembled wire,
- the second carbon nanotube group includes a second B carbon nanotube group composed of some of a plurality of carbon nanotubes composing the second carbon nanotube group, and a second b carbon nanotube group composed of some of the plurality of carbon nanotubes composing the second carbon nanotube group different from the plurality of carbon nanotubes composing the second B carbon nanotube group,
- the second channel includes a second-1B channel and a second-1b channel provided in parallel in the longitudinal direction of the carbon nanotube synthesis furnace, and a second-2 channel provided downstream of the second-1B channel and the second-1b channel as seen along the flow of the carbon-containing gas,
- the second B step includes
- a second B-1B step of orienting the second B carbon nanotube group in the second-1B channel in a longitudinal direction of the carbon nanotubes and thus assembling the group to obtain a second B carbon nanotube assembled elemental wire,
- a second B-1b step of orienting the second b carbon nanotube group in the second-1b channel in the longitudinal direction of the carbon nanotubes and thus assembling the group to obtain a second b carbon nanotube assembled elemental wire, and
- a second B-2 step of orienting a plurality of carbon nanotube assembled elemental wires including the second B carbon nanotube assembled elemental wire and the second b carbon nanotube assembled elemental wire in the second-2 channel in a longitudinal direction of the carbon nanotube assembled elemental wires and thus assembling the plurality of carbon nanotube assembled elemental wires together to obtain the second carbon nanotube assembled wire.

According to this, carbon nanotubes are assembled together to form a carbon nanotube assembled elemental wire, and furthermore, such carbon nanotube assembled elemental wires are assembled together to form a carbon nanotube assembled wire. The carbon nanotube assembled wire is easily elongated. Preferably, the second-1 channel and the second-2 channel each draw to draw therein CNTs produced in the first channel.

(3) The presently disclosed apparatus for manufacturing a carbon nanotube assembled wire comprises:

- a tubular carbon nanotube synthesis furnace;
- a carbon-containing gas supply port provided on one end side of the carbon nanotube synthesis furnace; and
- a first channel and a second channel provided on an end side of the carbon nanotube synthesis furnace opposite to the end provided with the carbon-containing gas supply port; wherein the first channel and the second channel are provided in parallel in a longitudinal direction of the carbon nanotube synthesis furnace and the first channel and the second channel each have an area in cross section smaller than that of the carbon nanotube synthesis furnace.

According to the present disclosure, a plurality of carbon nanotube assembled wires can be manufactured by a single carbon nanotube synthesis furnace.

(4) Preferably, the first channel includes a first-1A channel and a first-1a channel provided in parallel in the carbon nanotube synthesis furnace on a side closer to the carbon-containing gas supply port, and a first-2 channel provided on a side of the first-1A channel and the first-1a channel farther away from the carbon-containing gas supply port, and the second channel includes a second-1B channel and a second-1b channel provided in parallel in the carbon nanotube synthesis furnace on a side closer to the carbon-containing gas supply port, and a second-2 channel provided on a side of the second-1B channel and the second-1b channel farther away from the carbon-containing gas supply port.

According to this, carbon nanotubes are assembled together to form a carbon nanotube assembled elemental wire, and furthermore, such carbon nanotube assembled elemental wires are assembled together to form a carbon nanotube assembled wire. The carbon nanotube assembled wire is easily elongated.

(5) Preferably, the first-1A channel, the first-1a channel, the second-1B channel, and the second-1b channel are provided to the same first-1 structure, the first-2 channel is provided to a first-2 structure different from the first-1 structure, and the second-2 channel is provided to a second-2 structure different from the first-1 structure.

According to this, the carbon nanotubes and the carbon nanotube assembled wires are easily oriented in the longitudinal direction and thus assembled together.

(6) The first-1A channel, the first-1a channel, the first-2 channel, the second-1B channel, the second-1b channel, and the second-2 channel are provided to the same first-3 structure, an end of each of the first-1A channel and the first-1a channel farther away from the carbon-containing gas supply port is connected to an end of the first-2 channel closer to the carbon-containing gas supply port, and an end of each of the second-1B channel and the second-1b channel farther away from the carbon-containing gas supply port is connected to an end of the second-2 channel closer to the carbon-containing gas supply port.

According to this, the carbon nanotubes and the carbon nanotube assembled wires are easily oriented in the longitudinal direction and thus assembled together.

Detailed Description of Embodiments of the Present Disclosure

A specific example of the presently disclosed method and apparatus for manufacturing a carbon nanotube assembled wire will now be described below with reference to the drawings. In the drawings of the present disclosure, the same reference numerals designate identical or corresponding parts. In addition, dimensional relations in length, width, thickness, depth, and the like are changed as appropriate for clarity and simplicity of the drawings, and do not necessarily represent actual dimensional relations.

In the present specification, an expression in the form of "A to B" means a range's upper and lower limits (that is, A or more and B or less), and when A is not accompanied by any unit and B is alone accompanied by a unit, A has the same unit as B.

First Embodiment: Method for Manufacturing Carbon Nanotube Assembled Wire (1)

Figure 2:
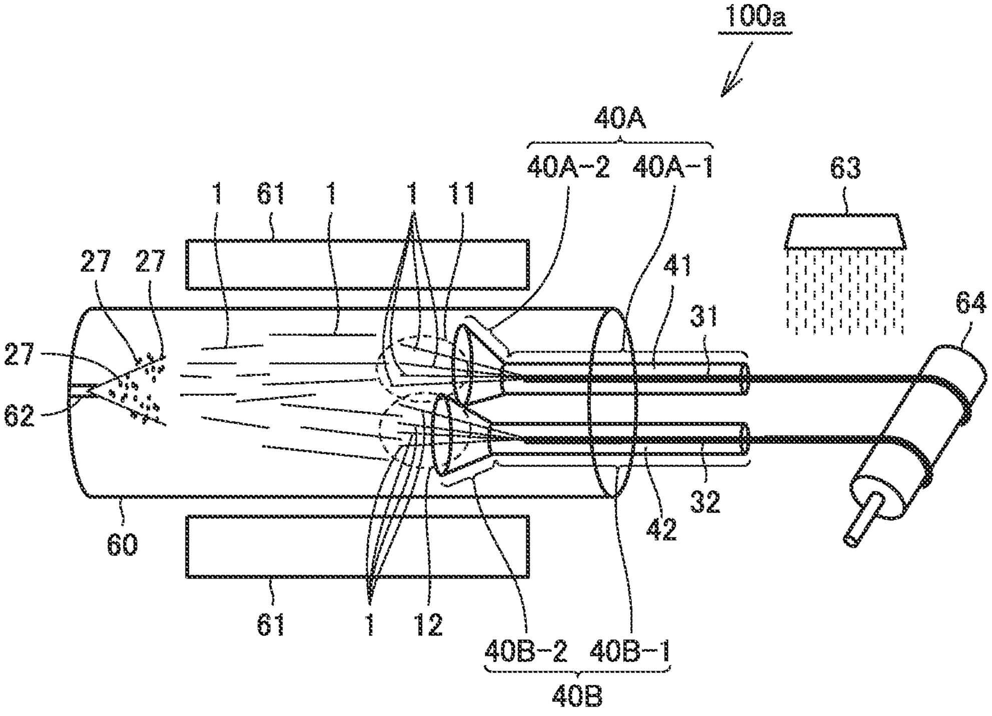
FIG. 2 shows an example of an apparatus for manufacturing a carbon nanotube assembled wire according to a second embodiment.

A method for manufacturing a carbon nanotube assembled wire according to one embodiment of the present disclosure (hereinafter also referred to as "the present embodiment") will now be described with reference to FIGS. 1 and 2. FIG. 1 is a flowchart of a method for manufacturing a carbon nanotube assembled wire (hereinafter also referred to as a "CNT assembled wire") according to the present embodiment. FIG. 2 shows an example of an apparatus for manufacturing a carbon nanotube assembled wire that is used in the method for manufacturing a carbon nanotube assembled wire according to the present embodiment.

As shown in FIGS. 1 and 2, a method for manufacturing a carbon nanotube assembled wire according to the present embodiment comprises: a first step of supplying a carbon-containing gas to a plurality of catalyst particles 27 in a suspended state in a tubular carbon nanotube synthesis furnace (hereinafter also referred to as a "CNT synthesis furnace") 60 to grow a carbon nanotube 1 from each of the plurality of catalyst particles 27 to obtain a plurality of carbon nanotubes 1; and a second step of assembling the plurality of carbon nanotubes 1 together to obtain a plurality of carbon nanotube assembled wires, the second step including a second A step of orienting a first carbon nanotube group 11 composed of some of the plurality of carbon nanotubes in a longitudinal direction of the carbon nanotubes in a first channel 41, and thus assembling the first carbon nanotube group to obtain a first carbon nanotube assembled wire 31, and a second B step of orienting a second carbon nanotube group 12 composed of some of the plurality of carbon nanotubes different from the plurality of carbon nanotubes composing first carbon nanotube group 11 in a longitudinal direction of the carbon nanotubes in a second channel 42, and thus assembling the second carbon nanotube group to obtain a second carbon nanotube assembled wire 32. It is preferable that, before entering first channel 41, the plurality of carbon nanotubes composing first carbon nanotube group 11 be separated from one another without assembling a network and thus preventing separation. It is preferable that, before entering second channel 42, the plurality of carbon nanotubes composing second carbon nanotube group 12 be separated from one another without assembling a network and thus preventing separation. This can prevent a plurality of carbon nanotubes from clogging around an entrance of the first channel and that of the second channel.

The method for manufacturing a carbon nanotube assembled wire according to the present embodiment allows a plurality of carbon nanotube assembled wires to be obtained by a single carbon nanotube synthesis furnace. This facilitates an increased size of the CNT synthesis furnace and mass production of CNT assembled wires, and allows a reduced manufacturing cost of CNT assembled wires.

<First Step>

A first step of obtaining a plurality of carbon nanotubes 1 is performed by supplying a carbon-containing gas to a plurality of catalyst particles 27 in a suspended state in a tubular carbon nanotube synthesis furnace 60 to grow a carbon nanotube 1 from each of the plurality of catalyst particles 27.

The first step is preferably performed under a condition in temperature of 800° C. or higher and 1500° C. or lower for example. Under the condition in temperature of 800° C. or higher and 1500° C. or lower, the carbon-containing gas is thermally decomposed and carbon crystal is grown on the catalyst particles in the suspended state to form carbon nanotubes. Separating a plurality of catalyst particles in close contact with one another in a flow of the carbon-containing gas allows CNTs to be also grown between the plurality of catalyst particles.

Temperature of 800° C. or higher allows carbon crystal to be grown at a higher rate and thus allows increased production efficiency. Temperature of 1500° C. or lower reduces content of impurity carbon and improves CNT in quality. The first step is performed under a condition in temperature more preferably of 900° C. or higher and 1400° C. or lower, and still more preferably 950° C. or higher and 1250° C. or lower.

In FIG. 2, catalyst particles 27 are suspended in the carbon-containing gas supplied to CNT synthesis furnace 60. Catalyst particles 27 are provided as follows: slurry having a catalytic material dissolved therein is sprayed through a spray nozzle disposed in CNT synthesis furnace 60 near a carbon-containing gas supply port to provide a catalyst (not shown) which is in turn heated and disintegrated by wind pressure of the carbon-containing gas to be particles.

Examples of the catalytic material include ferrocene ($Fe(C_5H_5)_2$), nickelocene ($Ni(C_5H_5)_2$), cobaltocene ($Co(C_5H_5)_2$, etc.), and the like. Inter alia, ferrocene is particularly preferable as it is excellent in disintegrability and catalysis and allows elongate CNT to be obtained. It is believed that, when ferrocene is heated to a high temperature and exposed to the carbon-containing gas, it forms iron carbide ($Fe_3C$) on a surface thereof through carburization, and is thus disintegratable from the surface to release catalyst particles 27 successively. In this case, a major ingredient of catalyst particles 27 formed will be iron carbide or iron.

Examples of catalyst particles 27 other than the above include nickel, cobalt, molybdenum, gold, silver, copper, palladium, and platinum.

Catalyst particles 27 have an average diameter with a lower limit preferably of 0.4 nm or more, more preferably 1 nm or more, and still more preferably 2 nm or more. Catalyst particles 27 have the average diameter with an upper limit preferably of 20 nm or less, more preferably 10 nm or less, and still more preferably 5 nm or less.

The carbon-containing gas is supplied through a carbon-containing gas supply port 62 to CNT synthesis furnace 60. As the carbon-containing gas, a reducing gas such as hydrocarbon gas is used. Examples of such a carbon-containing gas include a gaseous mixture of methane and argon, a gaseous mixture of ethylene and argon, a gaseous mixture of ethanol and argon, a gaseous mixture of ethylene and hydrogen, a gaseous mixture of methane and hydrogen, and a gaseous mixture of ethanol and hydrogen. The carbon-containing gas preferably includes carbon disulfide ($CS_2$) as an assistive catalyst.

A lower limit for the average flow velocity in the CNT synthesis furnace of the carbon-containing gas supplied through carbon-containing gas supply port 62 is preferably 0.05 cm/sec or more, more preferably 0.10 cm/sec or more, and still more preferably 0.20 cm/sec or more. An upper limit for the average flow velocity in CNT synthesis furnace 60 is preferably 50 cm/sec or less, more preferably 5.0 cm/sec or less. When the average flow velocity of the carbon-containing gas in CNT synthesis furnace 60 is 0.05 cm/sec or more, catalyst particles 27 are sufficiently supplied with the carbon-containing gas, which facilitates growth of carbon nanotubes synthesized between catalyst particles 27. When the average flow velocity of the carbon-containing gas in CNT synthesis furnace 60 is 10.0 cm/sec or less, it can prevent carbon nanotubes from detaching from catalyst particles 27 and thus stopping their growth.

A lower limit for the Reynolds number of the flow in CNT synthesis furnace 60 of the carbon-containing gas supplied through carbon-containing gas supply port 62 is preferably 0.01 or more, and more preferably 0.05 or more. An upper limit for the Reynolds number is preferably 1000 or less, more preferably 100 or less, still more preferably 10 or less. A Reynolds number of 0.01 or more allows the apparatus to be designed with an increased degree of freedom. A Reynolds number of 1000 or less suppresses a disturbed flow of the carbon-containing gas and hence a disturbed orientation of carbon nanotubes between catalyst particles 27.

Examples of carbon nanotube 1 obtained through the first step include a single-layer carbon nanotube in which only a single carbon layer (graphene) has a cylindrical shape, a double-layer carbon nanotube or a multilayer carbon nanotube in which a stack of a plurality of carbon layers has a cylindrical shape, and the like.

The shape of the carbon nanotube is not particularly limited, and both a carbon nanotube having closed ends and a carbon nanotube having open ends are also included. Further, carbon nanotube 1 may have one or opposite ends with catalyst particle 27, which is used in producing the carbon nanotube, adhering thereto.

Further, carbon nanotube 1 may have one or opposite ends with a conical portion formed of conical graphene.

The carbon nanotube has a length preferably of 1 μm or more, more preferably 10 μm or more, for example. In particular, when the length of the carbon nanotube is 100 μm or more, such a length is suitable from the viewpoint of producing the CNT assembled wire. Although an upper limit value for the length of the carbon nanotube is not particularly limited, it is preferably 600 mm or less from the viewpoint of manufacturing. The length of the CNT can be measured through observation with a scanning electron microscope.

The carbon nanotube has a diameter preferably of 0.4 nm or more and 20 nm or less, and more preferably 1 nm or more and 10 nm or less. In particular, when the diameter of the carbon nanotube is 1 nm or more and 10 nm or less, such a diameter is suitable from the viewpoint of high density and high adhesiveness.

In the present specification, a diameter of a carbon nanotube means an average outer diameter of a single CNT. The CNT's average outer diameter is obtained by directly observing cross sections at any two portions of the CNT with a transmission electron microscope, measuring in each cross section a distance between mutually remotest two points on the outer circumference of the CNT, that is, an outer diameter, and calculating an average value of such obtained outer diameters. When the CNT has one or opposite ends with the conical portion, the diameter is measured at a portion other than the conical portion.

<Second Step>

The second step of obtaining a plurality of carbon nanotube assembled wires (hereinafter also referred to as "CNT assembled wire") is performed by assembling together the plurality of carbon nanotubes obtained in the first step. The second step includes a second A step and a second B step. The second A step and the second B step will more specifically be described hereinafter.

<Second A Step>

The second A step is a step of orienting a first carbon nanotube group 11 composed of some of the plurality of carbon nanotubes 1 that is obtained in the first step in a longitudinal direction of the carbon nanotubes in a first channel 41 and thus assembling the first carbon nanotube group to obtain a first carbon nanotube assembled wire 31. A plurality of CNTs 1 synthesized in CNT synthesis furnace 60 enter first channel 41 with their longitudinal direction along the flow of the carbon-containing gas. First channel 41 is disposed to have its longitudinal direction along the flow of the carbon-containing gas. An area in cross section of first channel 41 to which the flow of the carbon-containing gas is normal is smaller than that in cross section of CNT synthesis furnace 60 to which the flow of the carbon-containing gas is normal. Accordingly, the plurality of CNTs 1 having entered first channel 41 are oriented in the longitudinal direction of the CNTs in first channel 41 and thus assembled together to form first CNT assembled wire 31.

<Second B Step>

The second B step is a step of obtaining a second carbon nanotube assembled wire 32, as follows: of the plurality of carbon nanotubes 1 obtained in the first step, a second carbon nanotube group 12 composed of some of a plurality of carbon nanotubes different from the plurality of carbon nanotubes composing first carbon nanotube group 11 is oriented in a longitudinal direction of the carbon nanotubes in a second channel 42 and thus assembled together. A plurality of CNTs 1 synthesized in CNT synthesis furnace 60 enter second channel 42 with their longitudinal direction along the flow of the carbon-containing gas. Second channel 42 is disposed to have its longitudinal direction along the flow of the carbon-containing gas. An area in cross section of second channel 42 to which the flow of the carbon-containing gas is normal is smaller than that in cross section of CNT synthesis furnace 60 to which the flow of the carbon-containing gas is normal. Accordingly, the plurality of CNTs 1 having entered second channel 42 are oriented in the longitudinal direction of the CNTs in second channel 42 and thus assembled together to form second CNT assembled wire 32.

In the method for manufacturing a CNT assembled wire according to the present embodiment, some of a plurality of CNTs synthesized in a single CNT synthesis furnace are oriented in a first channel and thus assembled together to form first CNT assembled wire 31, and some other of the plurality of CNTs are oriented in a second channel and thus assembled together to form second CNT assembled wire 32. That is, in the method for manufacturing a CNT assembled wire according to the present embodiment, two CNT assembled wires can be manufactured using a single CNT synthesis furnace. While in the present embodiment, the second step includes the two steps of the second A step and the second B step and two CNT assembled wires are obtained, the second step is not limited thereto. Increasing the number of channels in parallel in the second step can increase the number of CNT assembled wires obtained. The number of channels matches the number of CNT assembled wires obtained. Therefore, when there are three channels, three CNT assembled wires are obtained, and when there are four channels, four CNT assembled wires are obtained.

First carbon nanotube group 11 and second carbon nanotube group 12 (hereinafter, these are also referred to as a "carbon nanotube group") are each composed of a number of carbon nanotubes adjusted depending on the wire and diameter of the carbon nanotube assembled wire formed of the carbon nanotube group.

The carbon nanotube assembled wire obtained in the second step is in the form of a yarn formed of a plurality of carbon nanotubes oriented in their longitudinal direction and thus assembled together.

The length of the carbon nanotube assembled wire is not particularly limited, and can be adjusted as appropriate depending on the application. A lower limit for the length of the CNT assembled wire is preferably 100 μm or more, more preferably 1000 μm or more, and further preferably 10 cm or more, for example. Although an upper limit for the length of the CNT assembled wire is not particularly limited, it can be 100 km or less from the viewpoint of manufacturing. The length of the CNT assembled wire is preferably 100 μm or more and 100 km or less, more preferably 1000 μm or more and 10 km or less, and still more preferably 10 cm or more and 1 km or less. The length of the CNT assembled wire is measured through observation with a scanning electron microscope, an optical microscope, or visual observation.

The diameter of the carbon nanotube assembled wire is not particularly limited, and can be adjusted as appropriate depending on the application. A lower limit for the diameter of the CNT assembled wire is, for example, preferably 1 μm or more, more preferably 10 μm or more, still more preferably more than 100 m, and still more preferably 1000 μm or more. Although an upper limit for the diameter of the CNT assembled wire is not particularly limited, it can be 10000 μm or less from the viewpoint of manufacturing. The diameter of the CNT assembled wire is preferably 1 m or more and 10000 μm or less, more preferably 10 μm or more and 1000 μm or less, still more preferably more than 100 μm and 1000 μm or less, and still more preferably 300 μm or more and 1000 μm or less. In the present embodiment, the diameter of the CNT assembled wire is smaller than the length of the CNT assembled wire. That is, the direction of the length of the CNT assembled wire corresponds to the longitudinal direction.

In the present specification, the diameter of the carbon nanotube assembled wire means an average outer diameter of a single CNT assembled wire. The average outer diameter of a single CNT assembled wire is determined by observing cross sections of any two portions of the CNT assembled wire with a transmission electron microscope, a scanning electron microscope, or an optical microscope, measuring a distance between mutually remotest two points on the outer circumference of the CNT assembled wire in each cross section, that is, an outer diameter, and calculating an average value of such outer diameters.

It is confirmed through the following procedures (a1) to (a6) that the CNT assembled wire obtained in the present embodiment has a plurality of CNTs oriented in their longitudinal direction and thus assembled together.

(a1) Imaging CNT Assembled Wire

The CNT assembled wire is imaged using the following instrument under the following conditions.

Transmission electron microscope (TEM): "JEM2100" (product name) manufactured by JEOL Ltd.

Conditions: a magnification of 50,000 times to 1.2 million times, and an acceleration voltage of 60 kV to 200 kV (a2) Binarizing the Captured Image The image captured in the above step (a1) is binarized through the following procedure using the following image processing program.

Image processing program: Non-destructive paper surface fiber orientation analysis program "FiberOri8single03" (http://www.enomae.com/FiberOri/index.htm)

Processing Procedure

1. Histogram Average Brightness Correction
2. Background Removal
3. Binarization by Single Threshold
4. Brightness inversion.

(a3) Fourier Transform of Binarized Image

The image obtained in step (a2) is subjected to Fourier transform using the same image processing program (Non-destructive paper surface fiber orientation analysis program "FiberOri8single03" (http://www.enomae.com/FiberOri/index.htm)).

(a4) Calculating Degree of Orientation and Intensity of Orientation

In the Fourier-transformed image, with the X-axis having a positive direction represented as 0°, an average amplitude with respect to counterclockwise angle (0°) is calculated. A relationship between angle of orientation and intensity of orientation obtained from the Fourier-transformed image is graphically represented.

(a5) Measuring Half Width

Based on the above graphical representation, a full width at half maximum (FWHM) is measured.

(a6) Calculating Degree of Orientation

Based on the full width at half maximum, degree of orientation is calculated using the following equation (1).

$$\text{degree of orientation} = (180° - \text{full width at half maximum})/180° \quad (1)$$

A degree of orientation of 0 means being fully non-oriented. A degree of orientation of 1 means being fully oriented. In the present specification, when the degree of orientation is 0.8 or more and 1.0 or less, it is determined that a CNT assembled wire has a plurality of CNTs oriented in their longitudinal direction and thus assembled together.

When a carbon nanotube assembled wire is composed of carbon nanotubes with a degree of orientation of 0.8 or more and 1.0 or less, the CNT assembled wire is elongated while maintaining characteristics of electric conductivity and mechanical strength that the CNT has.

Note that, as measured by the applicants, it has been confirmed that, insofar as a given, single sample is measured, even when a result of measurement of degree of orientation is calculated a plurality of times while a location where a measurement field of view (having a size of 10 nm×10 nm) is selected is changed, such measurement results thus obtained do not have substantial variation.

<Another Step>

The method for manufacturing a CNT assembled wire according to the present embodiment preferably comprises, after the second step, a third step of adhering a volatile liquid to the plurality of carbon nanotube assembled wires and a fourth step of evaporating the volatile liquid adhered to the carbon nanotube assembled wires. This allows carbon nanotubes to be brought into close contact with one another uniformly and at a high density while the liquid with which the carbon nanotubes have gaps impregnated evaporates and thus escapes.

Examples of the volatile liquid include methanol, ethanol, isopropyl alcohol, acetone, methyl ethyl ketone, xylene, anisole, toluene, cresol, pyrrolidone, carbitol, carbitol acetate, water, epoxy monomers, acrylic monomers, chlorosulfonic acid, nitric acid, and sulfuric acid. The volatile liquid may include monomer, resin or acid.

The third step can be performed, for example, by using a liquid adhering apparatus 63 to atomize the volatile liquid into vapor and spraying the vapor to the CNT assembled wire. The fourth step can be performed by natural drying.

The third and fourth steps are performed preferably while applying tension to the CNT assembled wire by winding the CNT assembled wire with a winding apparatus 64. Thus, the obtained CNT assembled wire has an enhanced strength.

Second Embodiment: Apparatus for Manufacturing Carbon Nanotube Assembled Wire (1)

One example of an apparatus for manufacturing a carbon nanotube assembled wire that is used in the method for manufacturing a carbon nanotube assembled wire according to the first embodiment will now be described with reference to FIG. 2.

As shown in FIG. 2, an apparatus **100*a* for manufacturing a carbon nanotube assembled wire according to the present embodiment comprises: a tubular carbon nanotube synthesis furnace 60; a carbon-containing gas supply port 62 provided on one end side of carbon nanotube synthesis furnace 60 (or on a left side in FIG. 2); and a first channel 41 and a second channel 42 provided at an end side of carbon nanotube synthesis furnace 60 opposite to the end provided with carbon-containing gas supply port 62 (or on a right side in FIG. 2), wherein first channel 41 and second channel 42 are provided in parallel in a longitudinal direction of carbon nanotube synthesis furnace 60 and each have an area in cross section smaller than that of carbon nanotube synthesis furnace 60**.

<Carbon Nanotube Synthesis Furnace>

Carbon nanotube synthesis furnace (hereinafter also referred to as a "CNT synthesis furnace") 60 is in the form of a tube formed of quartz. In CNT synthesis furnace 60, carbon nanotubes 1 are formed on catalyst particles 27 using carbon-containing gas.

Carbon nanotube synthesis furnace 60 is heated with a heating device 61. When heated, CNT synthesis furnace 60 has an internal temperature preferably of 800° C. or higher to 1500° C. or lower, more preferably 900° C. or higher to 1400° C. or lower, and still more preferably 1000° C. or higher to 1200° C. or lower. In order to maintain such a temperature, the carbon-containing gas may be heated and thus supplied through carbon-containing gas supply port 62 into CNT synthesis furnace 60, or the carbon-containing gas may be heated in CNT synthesis furnace 60.

Carbon nanotube synthesis furnace 60 has a cross section with a diameter (Φ) of Φ30 mm or more, more preferably Φ100 mm or more, and still more preferably Φ300 mm or more from the viewpoint of ensuring a sufficient amount of synthesized carbon nanotubes. While an upper limit for an area in cross section of carbon nanotube synthesis furnace 60 is not particularly limited, it can be Φ1 μm or less from the viewpoint of the design of the apparatus. The area in cross section of carbon nanotube synthesis furnace 60 is preferably Φ30 mm or more and Φ1 μm or less, more preferably Φ50 mm or more and Φ500 mm or less, and still more preferably Φ100 mm or more and Φ200 mm less. In the present specification, the diameter of the cross section of CNT synthesis furnace 60 means a diameter of a circular hollow portion of the CNT synthesis furnace in a cross section to which the longitudinal direction (or center line) of the CNT synthesis furnace is normal.

<Carbon-Containing Gas Supply Port>

Carbon-containing gas supply port 62 is provided at one end of carbon nanotube synthesis furnace 60 (a left end thereof in FIG. 2), and the carbon-containing gas is supplied through carbon-containing gas supply port 62 to CNT synthesis furnace 60. A catalyst (not shown) is disposed in CNT synthesis furnace 60 near the carbon-containing gas supply port.

Carbon-containing gas supply port 62 can be configured to have a gas cylinder (not shown) and a flow control valve (not shown).

<First Channel and Second Channel>

First channel 41 and second channel 42 are provided on an end side of carbon nanotube synthesis furnace 60 opposite to the end provided with carbon-containing gas supply port 62. First channel 41 is provided in a first A structure 40A. Second channel 42 is provided in a first B structure 40B.

First A structure 40A is composed of a tubular first A-1 portion 40A-1 and a funnel-shaped first A-2 portion 40A-2 connected to an end of first A-1 portion 40A-1 closer to carbon-containing gas supply port 62 (or on a left side in FIG. 2). Note that an end of first A-2 portion 40A-2 having a smaller diameter is connected to the end of first A-1 portion 40A-1. Accordingly, in first A structure 40A, an end of first A-2 portion 40A-2 having a larger diameter faces carbon-containing gas supply port 62. Preferably, at least a portion of first A structure 40A is disposed inside CNT synthesis furnace 60. The above configuration allows CNTs to be easily taken into first channel 41.

First B structure 40B is composed of a tubular first B-1 portion 40B-1 and a funnel-shaped first B-2 portion 40B-2 connected to an end of first B-1 portion 40B-1 closer to carbon-containing gas supply port 62 (or on the left side in FIG. 2). Note that an end of first B-2 portion 40B-2 having a smaller diameter is connected to the end of first B-1 portion 40B-1. Accordingly, in first B structure 40B, an end of first B-2 portion 40B-2 having a larger diameter faces carbon-containing gas supply port 62. Preferably, at least a portion of first B structure 40B is disposed inside CNT synthesis furnace 60. The above configuration allows CNTs to be easily taken into second channel 42.

First channel 41 and second channel 42 are provided in parallel in the longitudinal direction of carbon nanotube synthesis furnace 60 and first channel 41 and second channel 42 each have an area in cross section smaller than that of carbon nanotube synthesis furnace 60. The above configuration allows a plurality of CNTs to be oriented in their longitudinal direction and thus assembled together inside each of first channel 41 and second channel 42 and thus form CNT assembled wires.

In the present specification, first channel 41 and second channel 42 being provided in parallel in the longitudinal direction of CNT synthesis furnace 60 means that the following items (i) and (ii) are satisfied.

(i) The longitudinal direction (or center line) of CNT synthesis furnace 60 and the longitudinal direction (or center line) of first channel 41 form an angle of 0° or more and 20° or less, and the longitudinal direction (or center line) of CNT synthesis furnace 60 and the longitudinal direction (or center line) of second channel 42 form an angle of 0° or more and 20° or less.

(ii) The longitudinal direction (or center line) of first channel 41 and the longitudinal direction (or center line) of second channel 42 form an angle of 0° or more and 40° or less.

In the present specification, an area in cross section of first channel 41 means an area of the first channel in a cross section to which the longitudinal direction (or center line) of the first channel is normal, and corresponds to an area in cross section of a hollow portion of the first A structure. As shown in FIG. 2, when the first channel is composed of a hollow portion of first A structure 40A composed of tubular first A-1 portion 40A-1 and funnel-shaped first A-2 portion 40A-2 with the hollow portion having a varying area in cross section, "the first channel having an area in cross section smaller than an area in cross section of the CNT synthesis furnace" means "the first channel having a largest one of areas in cross section smaller than an area in cross section of a hollow portion of the CNT synthesis furnace." For first channel 41, the largest area in cross section of the first channel corresponds to an area in cross section at the end of first A-2 portion 40A-2 closest to carbon-containing gas supply port 62. A relationship between an area in cross section of second channel 42 and that of CNT synthesis furnace 60 is also defined in the same manner as the above-described relationship between the area in cross section of first channel 41 and that of CNT synthesis furnace 60.

The area in cross section of each of first channel 41 and second channel 42 is smaller than the area in cross section of carbon nanotube synthesis furnace 60. This allows a tensile force to be applied to CNTs in the first channel and the second channel in a direction toward the downstream side of the carbon-containing gas. When a tensile force acts on an end of a carbon nanotube, the carbon nanotube is pulled while extending from catalyst particle 27, and thus drawn in the longitudinal direction while it is plastically deformed and reduced in diameter. This facilitates orienting and elongating the CNT assembled wire.

The area in cross section of each of first channel 41 and second channel 42 can be set, as appropriate, depending on the desired diameter of the CNT assembled wire. A lower limit for the area in cross section of each of first channel 41 and second channel 42 is preferably 0.1 $mm^2$ or more, more preferably 1 $mm^2$ or more, and still more preferably 10 $mm^2$ or more from the view point of facilitating the CNT assembled wire to have a diameter of Φ10 μm or more. An upper limit for the area in cross section of each of first channel 41 and the second channel is preferably 300 $mm^2$ or less, more preferably 200 $mm^2$ or less, and still more preferably 100 $mm^2$ or less from the view point of large orientation.

While in the present embodiment, the CNT synthesis furnace has an end side provided with two channels, i.e., the first channel and the second channel, in parallel, the number of channels is not limited to two and three or more channels can be provided. For the apparatus for manufacturing a CNT assembled wire according to the present embodiment, the number of channels provided in parallel corresponds to the number of CNT assembled wires to be produced. Therefore, the number of CNT assembled wires manufactured using a single CNT synthesis furnace can be increased by increasing the number of channels provided in parallel.

The area in cross section of CNT synthesis furnace 60 is not particularly limited insofar as it is large enough to allow first channel 41 and second channel 42 to be provided inside the CNT synthesis furnace. A plurality of CNT assembled wires can be manufactured in a single CNT synthesis furnace by appropriately adjusting the area in cross section of CNT synthesis furnace 60 depending on the number of channels and the area in cross section of the channels.

A lower limit for the area in cross section of the CNT synthesis furnace is, for example, preferably 500 $mm^2$ or more, more preferably 5000 $mm^2$ or more, and still more preferably 50000 $mm^2$ or more from the view point of more efficiently manufacturing the CNT assembled wire. While an upper limit for the area in cross section of the CNT synthesis furnace is not particularly limited, it can for example be 1 $m^2$ or less from the view point of manufacturing equipment. The area in cross section of the CNT synthesis furnace is preferably 500 $mm^2$ or more and 1 $m^2$ or less, more preferably 5000 $mm^2$ or more and 50000 $mm^2$ or less, and still more preferably 10000 $mm^2$ or more and 20000 $mm^2$ or less.

The first A structure and the first B structure are preferably identical in shape. This allows CNT assembled wires substantially uniform in shape to be collected from the respective structures.

<Other Configurations>

The apparatus for manufacturing a CNT assembled wire according to the present embodiment preferably comprises liquid adhering apparatus 63 to adhere a volatile liquid to carbon nanotube assembled wires 31 or 32. Details of the volatile liquid will not be described as it has been described in the first embodiment.

Liquid adhering apparatus 63 is disposed at a position where the volatile liquid can be caused to adhere to carbon nanotube assembled wires 31, 32. For example, as shown in FIG. 2, liquid adhering apparatus 63 can be disposed downstream of first channel 41 and second channel 42 as seen in a direction in which the carbon-containing gas flows.

The apparatus for manufacturing a CNT assembled wire according to the present embodiment preferably comprises winding apparatus 64 to wind carbon nanotube assembled wires 31 and 32 while applying tension to carbon nanotube assembled wires 31 and 32. Winding the CNT assembled wires while applying tension to and thus stretching the CNT assembled wires allows CNT assembled wires having large strength to be obtained.

Third Embodiment: Method for Manufacturing Carbon Nanotube Assembled Wire (2)

Figure 3:
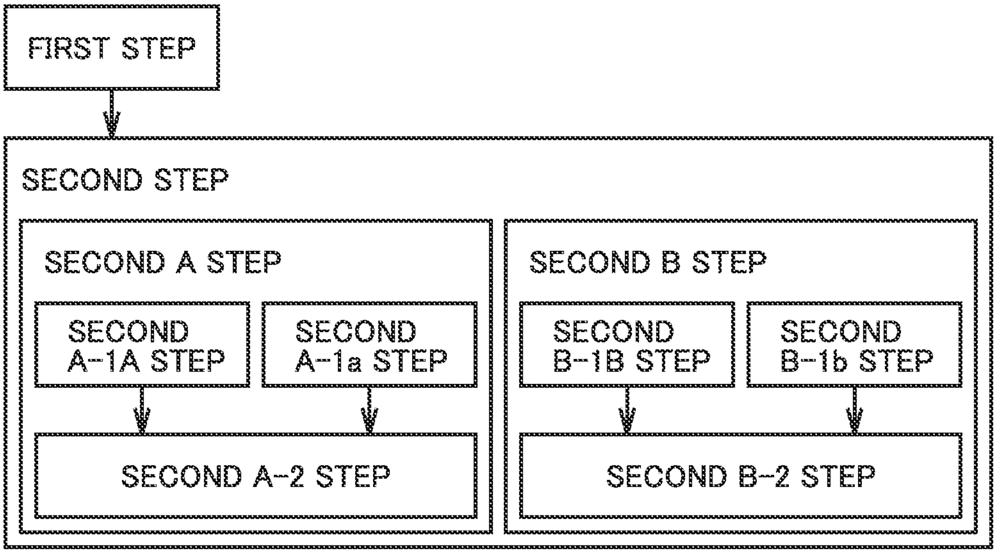
FIG. 3 is a flowchart of a method for manufacturing a carbon nanotube assembled wire according to a third embodiment.
Figure 4:
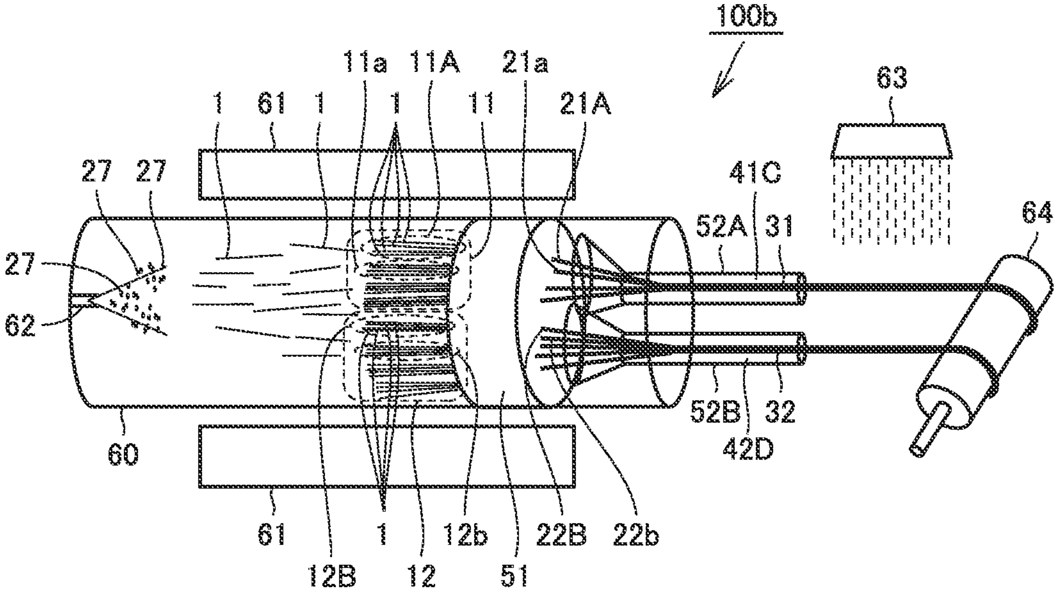
FIG. 4 shows an example of an apparatus for manufacturing a carbon nanotube assembled wire according to a fourth embodiment.
Figure 5:
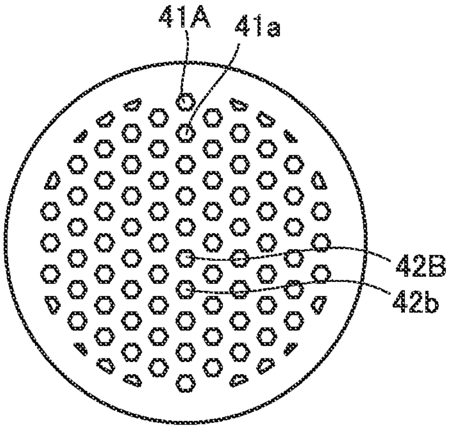
FIG. 5 shows an example of a major surface of a first-1 structure.
Figure 6:
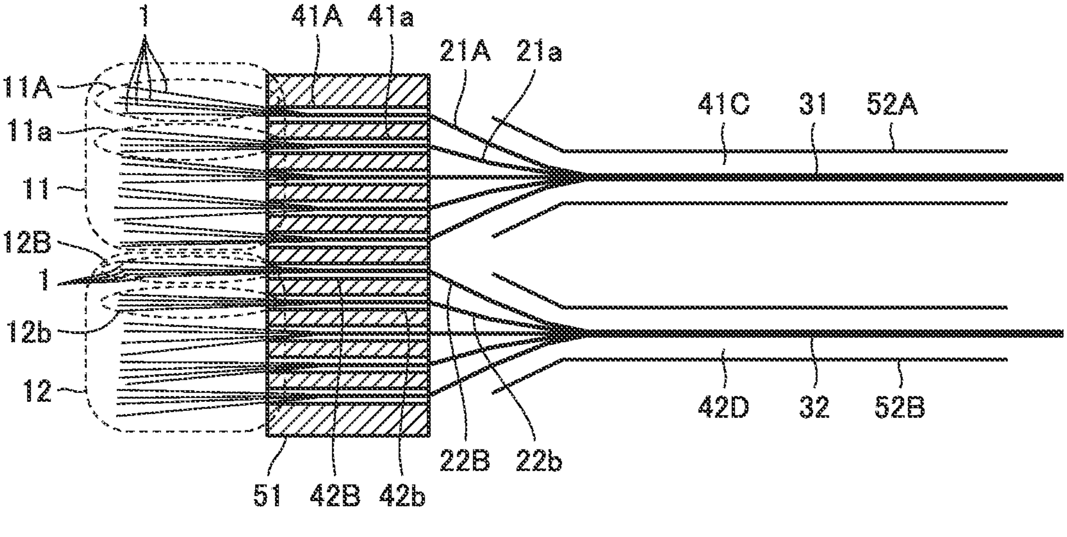
FIG. 6 is a cross section of a first channel and a second channel provided to the FIG. 4 apparatus for manufacturing a CNT assembled wire, taken in a direction of a CNT synthesis furnace.

A method for manufacturing a carbon nanotube assembled wire according to the present embodiment will now be described with reference to FIGS. 3 to 6. FIG. 3 is a flowchart of the method for manufacturing a carbon nanotube assembled wire according to the present embodiment. FIG. 4 shows an example of an apparatus for manufacturing a carbon nanotube assembled wire, that is used in the method for manufacturing a carbon nanotube assembled wire according to the present embodiment. FIG. 5 shows a major surface of the first-1 structure provided in the FIG. 4 apparatus for manufacturing a CNT assembled wire, that is closer to carbon-containing gas supply port 62. FIG. 6 is a cross section of a first channel and a second channel provided in the FIG. 4 apparatus for manufacturing a CNT assembled wire, in a direction along the longitudinal direction of the CNT synthesis furnace.

As shown in FIGS. 3 to 6, the method for manufacturing a CNT assembled wire according to the present embodiment can be the method for manufacturing the CNT assembled wire according to the first embodiment, wherein the first carbon nanotube group 11 includes a first A carbon nanotube group 11A composed of some of the plurality of carbon nanotubes composing the first carbon nanotube group 11 and a first a carbon nanotube group 11*a* composed of some of the plurality of carbon nanotubes composing first carbon nanotube group 11 different from the plurality of carbon nanotubes composing the first A carbon nanotube group 11A, the first channel includes a first-1A channel 41A and a first-1a channel 41*a* provided in parallel in the longitudinal direction of the carbon nanotube synthesis furnace, and a first-2 channel 41C provided downstream of the first-1A channel 41A and the first-1a channel 41*a* as seen along a flow of the carbon-containing gas, the second A step includes a second A-1A step of orienting the first A carbon nanotube group 11A in the first-1A channel 41A in a longitudinal direction of the carbon nanotubes and thus assembling the group to obtain a first A carbon nanotube assembled elemental wire 21A, a second A-1a step of orienting the first a carbon nanotube group 11*a* in the first-1a channel 41*a* in the longitudinal direction of the carbon nanotubes and thus assembling the group to obtain a first a carbon nanotube assembled elemental wire 21*a*, and a second A-2 step of orienting a plurality of carbon nanotube assembled elemental wires including the first A carbon nanotube assembled elemental wire 21A and the first a carbon nanotube assembled elemental wire 21*a* in the first-2 channel 41C in a longitudinal direction of the carbon nanotube assembled elemental wires and thus assembling the plurality of carbon nanotube assembled elemental wires together to obtain first carbon nanotube assembled wire 31, the second carbon nanotube group 12 includes a second B carbon nanotube group 12B composed of some of a plurality of carbon nanotubes composing the second carbon nanotube group, and a second b carbon nanotube group 12*b* composed of some of the plurality of carbon nanotubes composing the second carbon nanotube group 12 different from the plurality of carbon nanotubes composing the second B carbon nanotube group 12B, the second channel includes a second-1B channel 42B and a second-1b channel 42*b* provided in parallel in the longitudinal direction of the carbon nanotube synthesis furnace, and a second-2 channel 42D provided downstream of the second-1B channel 42B and the second-1b channel 42*b* as seen along the flow of the carbon-containing gas, the second B step includes a second B-1B step of orienting the second B carbon nanotube group 12B in the second-1B channel 42B in a longitudinal direction of the carbon nanotubes and thus assembling the group to obtain a second B carbon nanotube assembled elemental wire 22B, a second B-1b step of orienting the second b carbon nanotube group 12*b* in the second-1b channel 42*b* in the longitudinal direction of the carbon nanotubes and thus assembling the group to obtain a second b carbon nanotube assembled elemental wire 22*b*, and a second B-2 step of orienting a plurality of carbon nanotube assembled elemental wires including the second B carbon nanotube assembled elemental wire 22B and the second b carbon nanotube assembled elemental wire 22*b* in the second-2 channel 42D in a longitudinal direction of the carbon nanotube assembled elemental wires and thus assembling the plurality of carbon nanotube assembled elemental wires together to obtain second carbon nanotube assembled wire 32. It is preferable that, before entering first channel 41, the plurality of carbon nanotubes composing first carbon nanotube group 11 be separated from one another without assembling a network and thus preventing separation. It is preferable that, before entering second channel 42, the plurality of carbon nanotubes composing second carbon nanotube group 12 be separated from one another without assembling a network and thus preventing separation. This can prevent a plurality of carbon nanotubes from clogging around an entrance of the first channel and that of the second channel.

In the present specification, the first-1A channel, the first-1a channel, the second-1B channel, and the second-1b channel are also referred to as an "upstream channel." The 1-2 channel and the second-2 channel are also referred to as a "downstream channel."

In the method for manufacturing a CNT assembled wire according to the present embodiment, two CNT assembled wires can be manufactured using a single CNT synthesis furnace. While in the present embodiment the second step includes the two steps of the second A step and the second B step and two CNT assembled wires are obtained, the second step is not limited as such. The number of CNT assembled wires obtained can be increased by increasing the number of those of channels which are disposed downstream as seen along the flow of the carbon-containing gas, (i.e., the downstream channel corresponding in FIG. 4 to first-2 channel 41C and second-2 channel 42D) in parallel. The number of downstream channels is equal to the number of CNT assembled wires obtained. Therefore, when there are three downstream channels, three CNT assembled wires are obtained, and when there are four downstream channels, four CNT assembled wires are obtained.

The method for manufacturing the carbon nanotube assembled wire according to the present embodiment basically comprises all of the steps of the method for manufacturing the CNT assembled wire according to the first embodiment. The former is different from the latter in that the second A step and the second B step each include a step of obtaining a plurality of carbon nanotube assembled elemental wires (hereinafter also referred to as "CNT assembled elemental wires") (the second A-1A step, the second A-1a step, the second B-1B step, and the second B-1b step) and a step of orienting the plurality of CNT assembled elemental wires in their longitudinal direction and thus assembling them together to obtain a CNT assembled wire (the second A-2 step and the second B-2 step). Accordingly, hereinafter, the second A-1A step, the second A-1a step, the second A-2 step, the second B-1B step, the second B-1b step, and the second B-2 step will be described.

<Second A-1A Step, Second A-1a Step, Second B-1B Step, and Second B-1b Step>

The second A-1A step, the second A-1a step, the second B-1B step, and the second B-1b step are each a step of orienting a carbon nanotube group composed of a plurality of carbon nanotubes in the upstream channel in the longitudinal direction of the carbon nanotubes, and thus assembling the carbon nanotube group to obtain a carbon nanotube assembled elemental wire. As a representative of these steps, the second A-1 step will be described below.

In the second A-1 step, first A carbon nanotube group 11A composed of a plurality of CNTs synthesized in CNT synthesis furnace 60 enters first-1A channel 41A with the CNTs having their longitudinal direction along the flow of the carbon-containing gas. First-1A channel 41A is disposed to have its longitudinal direction along the flow of the carbon-containing gas. An area in cross section of first-1A channel 41A to which the flow of the carbon-containing gas is normal is smaller than that in cross section of CNT synthesis furnace 60 to which the flow of the carbon-containing gas is normal. Accordingly, the plurality of CNTs having entered first-1A channel 41A are oriented in first-1A channel 41A in the longitudinal direction of the CNTs and thus assembled together to form 1A carbon nanotube assembled elemental wire 21A.

A lower limit for the number of carbon nanotubes composing the first A carbon nanotube group is preferably 1000 or more, more preferably 1 million or more, and still more preferably 100 million or more from the viewpoint of elongating the carbon nanotube assembled elemental wire. An upper limit for the number of carbon nanotubes composing the first A carbon nanotube group is preferably 1 trillion or less, more preferably 10 billion or less, and still more preferably 1 billion or less from the viewpoint of preventing clogging of the channel. The number of carbon nanotubes composing the first A carbon nanotube group is preferably 10,000 or more and 1 billion or less, more preferably 100,000 or more and 100 million or less, and still more preferably 1 million or more and 100 million or less. Herein, the number of carbon nanotubes composing the first A carbon nanotube group means the number of the carbon nanotubes that simultaneously pass through an opening of first-1A channel 41A closer to the carbon-containing gas supply port.

The first A carbon nanotube assembled elemental wire 21A obtained in the second A-1A step is in the form of a yarn formed of a plurality of carbon nanotubes oriented in their longitudinal direction and thus assembled together.

The carbon nanotube assembled elemental wire (hereinafter also referred to as a "CNT assembled elemental wire") is not particularly limited in length insofar as it has a length allowing a carbon nanotube assembled wire to be configured in the next, second A-2 step.

The diameter of the carbon nanotube assembled elemental wire is not particularly limited, and can be adjusted as appropriate depending on the application. A lower limit for the diameter of the CNT assembled elemental wire is, for example, preferably 0.1 μm or more, and more preferably 1 μm or more. Although an upper limit for the diameter of the CNT assembled elemental wire is not particularly limited, it can be 100 μm or less from the viewpoint of manufacturing. The diameter of the CNT assembled elemental wire is preferably 0.1 μm or more and 100 μm or less, and more preferably 1 μm or more and 100 μm or less. In the present embodiment, the diameter of the CNT assembled elemental wire is smaller than the length of the CNT assembled elemental wire. That is, the direction of the length of the CNT assembled elemental wire corresponds to the longitudinal direction.

In the present specification, the diameter of the carbon nanotube assembled elemental wire means an average outer diameter of a single CNT assembled elemental wire. The average outer diameter of a single CNT assembled elemental wire is determined by observing cross sections of any two portions of the single CNT assembled elemental wire with a transmission electron microscope or a scanning electron microscope, measuring a distance between mutually remotest two points on the outer circumference of the CNT assembled elemental wire in each cross section, that is, an outer diameter, and calculating an average value of such outer diameters.

The fact that the CNT assembled elemental wire obtained in the present embodiment has a plurality of CNTs oriented in their longitudinal direction and thus assembled together can be confirmed in the same method employed to confirm that "the CNT assembled wire has a plurality of CNTs oriented in their longitudinal direction and thus assembled together" as described in the first embodiment, and thus will not be described repeatedly.

The carbon nanotube assembled elemental wire is composed of CNTs with a degree of orientation preferably of 0.8 or more and 1.0 or less. The CNT assembled elemental wire is elongated while maintaining the characteristics that the CNT has in electrical conductivity and mechanical strength.

The second A-1a step, the second B-1B step, and the second B-1b step will not be described as they are basically the same steps as the second A-1 step.

<Second A-2 Step and Second B-2 Step>

The second A-2 step and the second B-2 step are each a step in which a plurality of CNT assembled elemental wires are oriented in their longitudinal direction in the downstream channel and thus assembled together to form a carbon nanotube assembled wire. As a representative of these steps, the second A-2 step will be described hereinafter.

In the second A-2 step, a plurality of carbon nanotube assembled elemental wires including first A carbon nanotube assembled elemental wire 21A obtained in the second A-1A step and first a carbon nanotube assembled elemental wire 21*a* obtained in the second A-1a step enter first-2 channel 41C while the CNT assembled elemental wires have their longitudinal direction along the flow of the carbon-containing gas. First-2 channel 41C is disposed to have its longitudinal direction along the flow of the carbon-containing gas. The plurality of CNT assembled elemental wires having entered first-2 channel 41C are oriented in their longitudinal direction in first-2 channel 41C and thus assembled together to form first carbon nanotube assembled wire 31.

Providing the downstream channel (first-2 channel 41C) can prevent the plurality of carbon nanotube assembled elemental wires exiting the upstream channel (the first-1A channel and the first-1a channel) from being entangled with one another without orientation and allows the plurality of carbon nanotube assembled elemental wires to be oriented in the downstream channel in the longitudinal direction and thus assembled together to form a carbon nanotube assembled wire.

A lower limit for the number of carbon nanotube assembled elemental wires composing the first carbon nanotube assembled wire is preferably 2 or more, more preferably 10 or more, and still more preferably 100 or more from the viewpoint of elongating the carbon nanotube assembled elemental wire. An upper limit for the number of carbon nanotube assembled elemental wires composing the first carbon nanotube assembled wire is preferably 10000 or less, more preferably 1000 or less, and still more preferably 300 or less from the viewpoint of preventing clogging of the channel. The number of carbon nanotube assembled elemental wires composing the first carbon nanotube assembled wire is preferably 2 or more and 10000 or less, more preferably 10 or more and 1000 or less, and still more preferably 100 or more and 300 or less. Herein, the number of carbon nanotube assembled elemental wires composing the first carbon nanotube assembled wire means the number of carbon nanotube assembled elemental wires that simultaneously pass through an opening of first-2 channel 41C closer to the carbon-containing gas supply port.

The carbon nanotube assembled wire is in the form of a string formed of a plurality of carbon nanotube assembled elemental wires oriented in their longitudinal direction and thus assembled together. The fact that the CNT assembled wire is in the form of a string formed of a plurality of carbon nanotube assembled elemental wires oriented in their longitudinal direction and thus assembled together can be confirmed through observation with an optical microscope or a scanning electron microscope.

The length of the carbon nanotube assembled wire obtained in the present embodiment is not particularly limited, and can be adjusted as appropriate depending on the application. For a lower limit for the length of the CNT assembled wire is, for example, preferably 100 μm or more, more preferably 1000 μm or more, and still more preferably 10 cm or more. Although an upper limit for the length of the CNT assembled wire is not particularly limited, it is preferably 100 km or less from the viewpoint of manufacturing. The length of the CNT assembled wire is preferably 100 m or more and 10 km or less, more preferably 1000 μm or more and 1 km or less, and still more preferably 10 cm or more and 100 μm or less. The length of the CNT assembled wire can be measured through observation with an optical microscope or visual observation.

The diameter of the carbon nanotube assembled wire obtained in the present embodiment is not particularly limited, and can be adjusted as appropriate depending on the application. The diameter of the CNT assembled wire is preferably 1 μm or more, and further preferably 10 μm or more, for example. Although an upper limit value for the diameter of the CNT assembled wire is not particularly limited, it is preferably 10000 μm or less from the viewpoint of manufacturing. In the present embodiment, the diameter of the CNT assembled wire is smaller than the length of the CNT assembled wire.

The degree of orientation of the CNT assembled elemental wire in the carbon nanotube assembled wire is basically a value calculated through a procedure similar to that of steps (a1) to (a6) described in the first embodiment for a method for calculating a degree of orientation. What is different is that, in step (a1), the CNT assembled wire is imaged using the following equipment under the following conditions:

Scanning electron microscopy (SEM): Cry-10 (product name) manufactured by Technex Lab Co., Ltd.

Imaging conditions: a magnification of 40 times to 100,000 times, and an acceleration voltage of 1 kV to 17 kV.

Measurement field of view: 30 μm×30 μm

The above measurement is performed at ten or more arbitrarily selected measurement fields of view. When one or more of the all of the measurement fields of view show that the carbon nanotube assembled wire has the carbon nanotube assembled elemental wires with a degree of orientation of 0.8 or more and 1 or less, it is determined that the carbon nanotube assembled wire has the carbon nanotube assembled elemental wires oriented in their longitudinal direction and thus assembled together.

The carbon nanotube assembled wire according to the present embodiment is composed of carbon nanotubes oriented at a degree of orientation of 0.9 or more and 1 or less, and the carbon nanotube assembled wire is oriented preferably at a degree of orientation of 0.8 or more and 1 or less. This means that the CNT assembled wire of the present embodiment has CNTs and CNT assembled wires highly oriented. Thus, the CNT assembled wire can be excellent in electrical conductivity and mechanical strength.

Fourth Embodiment: Apparatus for Manufacturing Carbon Nanotube Assembled Wire (2)

An apparatus for manufacturing a carbon nanotube assembled wire used in the method for manufacturing the carbon nanotube assembled wire according to the third embodiment will now be described with reference to FIGS. 4-6.

An apparatus 100*b* for manufacturing a carbon nanotube assembled wire according to the present embodiment basically comprises all of the configuration of the apparatus of manufacturing a carbon nanotube assembled wire according to the second embodiment. The former differs from the latter in that, as shown in FIGS. 4 and 6, the first channel includes first-1A channel 41A and first-1a channel 41*a* provided in parallel in carbon nanotube synthesis furnace 60 on a side closer to carbon-containing gas supply port 62, and first-2 channel 41C provided on a side of first-1A channel 41A and first-1a channel 41*a* farther away from carbon-containing gas supply port 62, and the second channel includes second-1B channel 42B and second-1b channel 42*b* provided in parallel in carbon nanotube synthesis furnace 60 on a side closer to the carbon-containing gas supply port, and second-2 channel 42D provided on a side of second-1B channel 42B and second-1b channel 42*b* farther away from carbon-containing gas supply port 62. Hereinafter will be described how the apparatus for manufacturing a carbon nanotube assembled wire according to the present embodiment differs from that according to the second embodiment.

In the present embodiment, as shown in FIG. 6, first-1A channel 41A, first-1a channel 41*a*, second-1B channel 42B, and second-1b channel 42*b* are provided in the same first-1 structure 51, first-2 channel 41C is provided in a first-2 structure 52A different from first-1 structure 51, and second-2 channel 42D is provided in a second-2 structure 52B different from first-1 structure 51.

<First-1 Structure>

First-1 structure 51 is a porous body having a large number of narrow cylindrical through holes. Each through hole corresponds to a channel. First-1 structure 51 has through holes corresponding to first-1A channel 41A, first-1a channel 41*a*, second-1B channel 42B, and second-1b channel 42*b*.

Each through hole can have a cross section for example of a circle or a regular polygon (for example, a regular polygon with n vertices, where n=3 to 10). From the viewpoint of suppressing deposition of CNTs in the through holes and ensuring that the first-1 structure has strength, each through-hole preferably has a cross section of a regular hexagon.

Each through hole can have an area in cross section changed, as appropriate, depending on the desired diameter, length, and/or the like of the CNT assembled elemental wire. A lower limit for the area in cross section of each through hole is preferably 0.005 mm$^2$ or more, more preferably 0.01 mm$^2$ or more, still more preferably 0.05 mm$^2$ or more, still more preferably 0.1 mm$^2$ or more, and still more preferably 0.5 mm$^2$ or more from the viewpoint of preventing clogging of CNTs. An upper limit for the area in cross section of each through hole is, for example, preferably 100 mm$^2$ or less, more preferably 50 mm$^2$ or less, and still more preferably 10 mm$^2$ or less from the viewpoint of ease of assembling of CNTs. In the present specification, the area in cross section of each through hole means an area in a cross section to which the longitudinal direction of a hollow portion surrounded by the first-1 structure forming a periphery of the through hole is normal. Preferably, each through hole has an area in cross section fixed from the upstream side to the downstream side. Herein, an area in cross section being fixed means that the area in cross section has a maximum value and a minimum value equal to an average value±5%.

A lower limit for the length of the through hole in the longitudinal direction (a direction along the flow of the carbon-containing gas) is preferably 5 mm or more, more preferably 10 mm or more, and still more preferably 30 mm or more from the viewpoint of sufficiently assembling CNTs. An upper limit for the length of the through hole in the longitudinal direction is preferably 1000 mm or less, more preferably 300 mm or less, and still more preferably 100 mm or less from the viewpoint of suppressing deposition of CNTs on the inner wall of the through hole and collecting an increased amount of CNT assembled elemental wires. The length of the through hole in the longitudinal direction is preferably 5 mm or more and 1000 mm or less, more preferably 10 mm or more and 300 mm or less, and still more preferably 30 mm or more and 100 mm or less.

The number of through holes provided in the first-1 structure can be set, as appropriate, with the area in cross section of the hollow portion of the CNT synthesis furnace, the area in cross section of each through hole, the number of CNT assembled elemental wires desired, etc. taken into consideration. For example, a lower limit for the number of through holes provided in the first-1 structure is preferably $\frac{1}{10}$ cm$^2$ or more, more preferably 1/cm$^2$ or more, and still more preferably 1/mm$^2$ or more from the viewpoint of efficient manufacture. An upper limit for the number of through holes provided in the first-1 structure is not particularly limited, and can for example be 100 through holes/mm$^2$ or less. The number of through holes provided in the first-1 structure is preferably $\frac{1}{10}$ cm$^2$ or more and 100/mm$^2$ or less, more preferably 1/cm$^2$ or more and 100/mm$^2$ or less, and still more preferably 1/mm$^2$ or more and 10/mm$^2$ or less.

An area in cross section of the first-1 structure is not limited and can be set depending on the area in cross section of the hollow portion of the CNT synthesis furnace. Herein, the area in cross section of the first-1 structure means an area of a region surrounded by the periphery of the first-1 structure, and is an area also including the through holes. A lower limit for the area in cross section of the first-1 structure is preferably 100 mm$^2$ or more, more preferably 1000 mm$^2$ or more, and still more preferably 10000 mm$^2$ or more from the viewpoint of more efficiently manufacturing the CNT assembled wire. An upper limit for the area in cross section of the first-1 structure is not particularly limited, and can for example be 1 m$^2$ or less from the viewpoint of manufacturing equipment. The area in cross section of the first-1 structure is preferably 100 mm$^2$ or more and 1 m$^2$ or less, more preferably 1000 mm$^2$ or more and 0.3 m$^2$ or less, and still more preferably 10000 mm$^2$ or more and 0.1 m$^2$ or less.

The first-1 structure can be made of ceramic (alumina, zirconia, aluminum nitride, silicon carbide, silicon nitride, forsterite, steatite, cordierite, mullite, ferrite, gadolinium oxide, etc.), quartz glass, metals, or graphite. Inter alia, ceramic material is preferable from the view point of heat resistance and durability required in producing CNTs. Further, it is preferable to form any channel by 3D printing.

<First-2 Structure and Second-2 Structure>

First-2 structure 52A and second-2 structure 52B will not be described as they can basically have the same configuration as the first A structure and the first B structure of the second embodiment.

Fifth Embodiment: Apparatus for Manufacturing Carbon Nanotube Assembled Wire (3)

An apparatus for manufacturing a carbon nanotube assembled wire according to a fifth embodiment is another example of the apparatus used in the method for manufacturing the carbon nanotube assembled wire according to the third embodiment. The apparatus for manufacturing a carbon nanotube assembled wire according to the fifth embodiment will now be described with reference to FIGS. 7 to 10.

Figure 7:
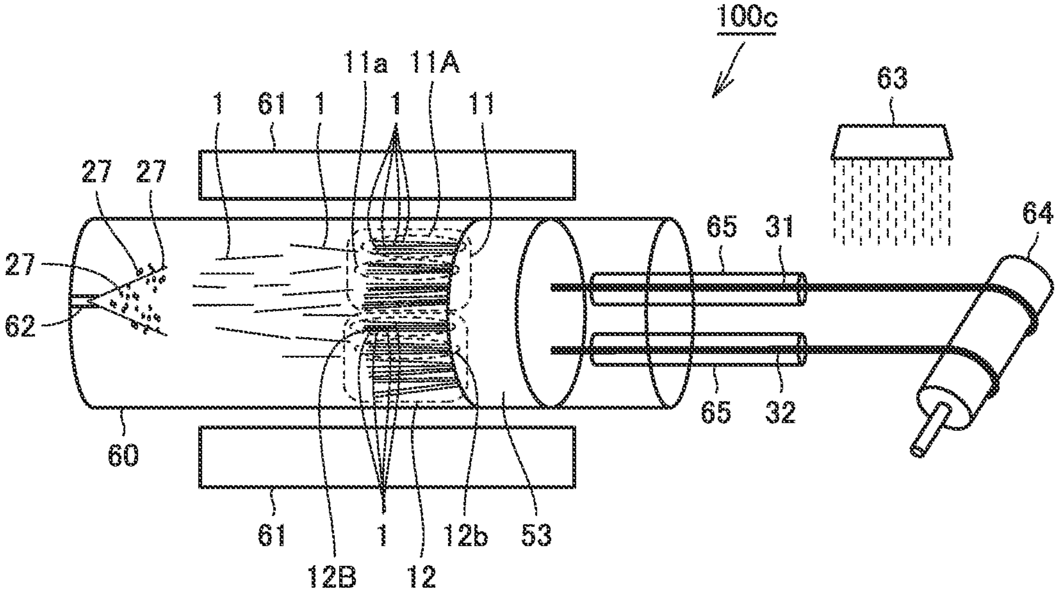
FIG. 7 shows an example of an apparatus for manufacturing a carbon nanotube assembled wire according to a fifth embodiment.
Figure 8:
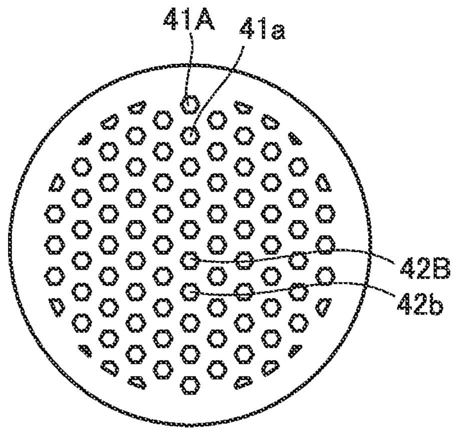
FIG. 8 shows an example of a major surface of a first-3 structure on the side of a carbon-containing gas supply port.
Figure 9:
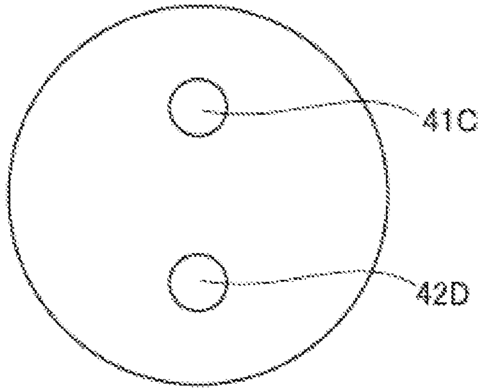
FIG. 9 shows an example of a major surface of the first-3 structure on a side opposite to that of the carbon-containing gas supply port.
Figure 10:
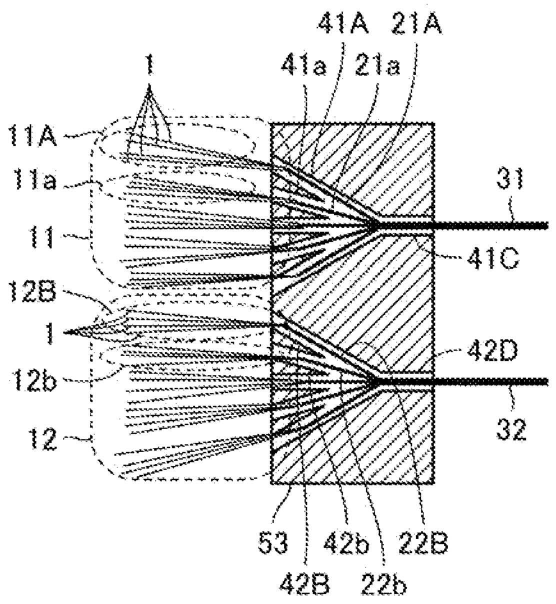
FIG. 10 shows an example of a cross section of the first-3 structure.

FIG. 7 shows an example of an apparatus for manufacturing a carbon nanotube assembled wire, that is used in the method for manufacturing a carbon nanotube assembled wire according to the present embodiment. FIG. 8 shows a major surface of a first-3 structure 53 provided in the FIG. 7 apparatus for manufacturing a CNT assembled wire, that is closer to carbon-containing gas supply port 62. FIG. 9 shows a major surface of first-3 structure 53 provided in the FIG. 7 apparatus for manufacturing a CNT assembled wire facing away from carbon-containing gas supply port 62. FIG. 10 is a cross section of first-3 structure 53 provided in the FIG. 7 apparatus for manufacturing a CNT assembled wire, taken along the longitudinal direction of the CNT synthesis furnace. Hereinafter will be described how the apparatus for manufacturing a carbon nanotube assembled wire according to the present embodiment differs from that according to the fourth embodiment.

In the present embodiment, as shown in FIG. 10, first-1A channel 41A, first-1a channel 41*a*, first-2 channel 41C, second-1B channel 42B, second-1b channel 42*b*, and second-2 channel 42D are provided in the same first-3 structure 53, and an end of each of first-1A channel 41A and first-1a channel 41*a* facing away from carbon-containing gas supply port 62 is connected to an end of first-2 channel 41C closer to carbon-containing gas supply port 62 and an end of each of second-1B channel 42B and second-1b channel 42*b* facing away from carbon-containing gas supply port 62 is connected to an end of second-2 channel 42D closer to carbon-containing gas supply port 62.

<First-3 Structure>

First-3 structure 53 is a porous body having a large number of narrow cylindrical through holes. The through hole corresponds to a channel. A major surface of the first-3 structure closer to carbon-containing gas supply port 62 has a plurality of openings including openings forming ends of first-1A channel 41A, first-1a channel 41*a*, second-1B channel 42B, and second-1b channel 42*b* (hereinafter also referred to as a "first opening"). A major surface of the first-3 structure opposite to that closer to carbon-containing gas supply port 62 has a plurality of openings including openings forming ends of first-2 channel 41C and second-2 channel 42D (hereinafter also referred to as a "second opening").

A plurality of CNTs entering first-1A channel 41A and first-1a channel 41*a* are oriented in the longitudinal direction and thus assembled together to form CNT assembled elemental wires 21A and 21*a*, and subsequently, a plurality of CNT assembled elemental wires including CNT assembled elemental wires 21A and 21*a* are oriented in the longitudinal direction and thus assembled together in first-2 channel 41C to form CNT assembled wire 31.

A plurality of CNTs entering second-1B channel 42B and second-1b channel 42*b* are oriented in the longitudinal direction and thus assembled together to form CNT assembled elemental wires 21B and 21*b*, and subsequently, a plurality of CNT assembled elemental wires including CNT assembled elemental wires 21B and 21*b* are oriented in the longitudinal direction and thus assembled together in second-2 channel 41D to form CNT assembled wire 32.

Thus, in the present embodiment, CNT assembled elemental wires and CNT assembled wires are continuously formed inside first-3 structure 53. This allows CNT assembled wires to be manufactured more efficiently.

The number of channels connected to first-2 channel 41C is not limited to two, i.e., first-1A channel 41A and first-1a channel 41*a*, and can be set, as appropriate, depending on the length, diameter and/or the like of a CNT assembled wire desired. A lower limit for the number of channels connected to first-2 channel 41C is preferably 2 or more, more preferably 5 or more, and still more preferably 10 or more from the viewpoint of preventing disturbance caused by turbulence or the like. While an upper limit for the number of channels connected to first-2 channel 41C is not particularly limited, it can be 100 or less from the viewpoint of manufacturing the first-3 structure. The number of channels connected to first-2 channel 41C is preferably 2 or more and 100 or less, more preferably 5 or more and 50 or less, and still more preferably 10 or more and 20 or less. The number of channels connected to second-2 channel 42D can also be set in the same manner as the number of channels connected to first-2 channel 41C.

A lower limit for the area in cross section of each of through holes forming first-1A channel 41A, first-1a channel 41*a*, second-1B channel 42B, and second-1b channel 42*b* is preferably 0.005 $mm^2$ or more, more preferably 0.01 $mm^2$ or more, still more preferably 0.05 $mm^2$ or more, still more preferably 0.1 $mm^2$ or more, and still more preferably 0.5 $mm^2$ or more, from the viewpoint of preventing clogging of CNTs. An upper limit for the area in cross section of each through hole is, for example, preferably 100 $mm^2$ or less, more preferably 50 $mm^2$ or less, and still more preferably 10 $mm^2$ or less from the viewpoint of ease of assembling of CNTs. In the present specification, the area in cross section of each through hole means an area of a region surrounded by the first-3 structure forming a periphery of the through hole. Preferably, each through hole has an area in cross section fixed from the upstream side to the downstream side. Herein, an area in cross section being fixed means that the area in cross section has a maximum value and a minimum value equal to an average value±5%.

A lower limit for the length of the through hole that forms first-1A channel 41A, first-1a channel 41*a*, second-1B channel 42B, and second-1b channel 42*b* in a longitudinal direction (a direction along the flow of the carbon-containing gas) is preferably 10 mm or more, more preferably 20 mm or more, and still more preferably 50 mm or more from the viewpoint of sufficiently assembling CNTs together. An upper limit for the length of the through hole in the longitudinal direction is preferably 1000 mm or less, more preferably 500 mm or less, and still more preferably 100 mm or less from the viewpoint of suppressing deposition of CNTs on the inner wall of the through hole and collecting an increased amount of CNT assembled elemental wires. The length of the through hole in the longitudinal direction is preferably 10 mm or more and 1000 mm or less, more preferably 20 mm or more and 500 mm or less, and still more preferably 30 mm or more and 1000 mm or less.

A lower limit for the area in cross section of the through hole forming first-2 channel 41C and second-2 channel 42D is preferably 0.01 $mm^2$ or more, more preferably 0.02 $mm^2$ or more, still more preferably 0.1 $mm^2$ or more, still more preferably 0.2 $mm^2$ or more, and still more preferably 0.5 $mm^2$ or more, from the viewpoint of preventing clogging of CNT assembled elemental wires. An upper limit for the area in cross section of each through hole is, for example, preferably 100 $mm^2$ or less, more preferably 10 $mm^2$ or less, and still more preferably 1 $mm^2$ or less from the viewpoint of ease of assembling of CNT assembled elemental wires.

A lower limit for the length of the through hole that forms first-2 channel 41C and second-2 channel 42D in the longitudinal direction (the direction along the flow of the carbon-containing gas) is preferably 5 mm or more, more preferably 10 mm or more, and still more preferably 20 mm or more from the viewpoint of sufficiently assembling CNT assembled elemental wires together. An upper limit for the length of the through hole in the longitudinal direction is preferably 1000 mm or less, more preferably 100 mm or less, and still more preferably 50 mm or less from the viewpoint of suppressing deposition of CNT assembled elemental wires on the inner wall of the through hole and collecting an increased amount of CNT assembled wires. The length of the through hole in the longitudinal direction is preferably 5 mm or more and 1000 mm or less, more preferably 10 mm or more and 100 mm or less, and still more preferably 5 mm or more and 50 mm or less.

<Other Configurations>

The apparatus for manufacturing a CNT assembled wire according to the present embodiment can comprise a CNT assembled wire guiding tube 65 provided on a side of first-3 structure 53 farther away from carbon-containing gas supply port 62. The CNT assembled wire guiding tube is preferably provided on an extension downstream of each of first-2 channel 41C and second-2 channel 42D provided to the first-3 structure. This prevents a plurality of CNT assembled wires exiting first-3 structure 53 from being entangled together and thus allows them to be separated from one another and thus collected.

EXAMPLES

The embodiments will now be described more specifically with reference to examples. Note, however, that the embodiments are not limited by these examples.

Example 1

As an apparatus 1 is prepared an apparatus for manufacturing a carbon nanotube assembled wire having the same configuration as the FIG. 2 apparatus for manufacturing a carbon nanotube assembled wire. It has a specific configuration as follows:

Apparatus 1 comprises: a carbon nanotube synthesis furnace (a quartz tube having a hollow portion with a diameter of 50 mm (with an area in cross section of about 2000 mm$^2$), and a length 50 mm); a carbon-containing gas supply port provided on one end side of the carbon nanotube synthesis furnace (i.e., on a left side in FIG. 2); and a first channel (having a maximum diameter of 10 mm and a length of 500 mm) and a second channel (having a maximum diameter of 10 mm and a length of 500 mm) provided on an end side of the carbon nanotube synthesis furnace opposite to the end provided with the carbon-containing gas supply port (i.e., on a right side in FIG. 2). The first channel and the second channel are provided in parallel in the longitudinal direction of the carbon nanotube synthesis furnace. A distance from the end of the CNT synthesis furnace closer to the carbon-containing gas supply port to the ends of the first and second channels closer to the carbon-containing gas supply port is set to 2000 mm. A slurry atomizer in which a catalyst (ferrocene) is dissolved in toluene is disposed in the CNT synthesis furnace near the carbon-containing gas supply port. An apparatus for winding CNT assembled wires is disposed downstream of the first channel and the second channel.

Apparatus 1 is used to produce a carbon nanotube assembled wire for a sample 1. In apparatus 1, an electric furnace's internal temperature is raised to 1200° C. while an argon gas having an argon gas concentration of 100% by volume is supplied through the carbon-containing gas supply port into the CNT synthesis furnace at a flow rate of 1000 cc/min (flow velocity: 3.4 cm/sec) for 50 minutes. Subsequently, the argon gas is switched to hydrogen gas (1000 cc/min), and methane gas is supplied at a flow rate of 50 cc/min (flow velocity: 0.17 cm/sec) and carbon disulfide ($CS_2$) gas is supplied at a flow rate of 1 cc/min (flow velocity: 0.003 cm/sec) for 120 minutes. A gaseous mixture including the hydrogen gas, the methane gas, and the carbon disulfide (i.e., the carbon-containing gas) as a whole has a flow velocity of 3.6 cm/sec.

By supplying the hydrogen gas, the methane gas, and the carbon disulfide gas, catalyst particles are discharged into the CNT synthesis furnace. Subsequently, CNTs are grown in the CNT synthesis furnace, and assembled together in each of the first and second channels to form two CNT assembled wires. The CNT assembled wires are wound by the winding apparatus, and two CNT assembled wires are thus collected.

[Measuring Carbon Nanotube Assembled Wire]

(Degree of Orientation)

The two carbon nanotube assembled wires of sample 1 each have its CNTs measured in degree of orientation. Degrees of orientation is calculated in the same method as that described in the first embodiment, and accordingly, the method will not be described repeatedly.

The two carbon nanotube assembled wires of sample 1 have their CNTs with degrees of orientation of 0.8 and 0.9, respectively. Thus, it is confirmed that the CNT assembled wires obtained in apparatus 1 have CNTs oriented in their longitudinal direction and thus assembled together.

(Shape)

The two carbon nanotube assembled wires of sample 1 are each measured in length and diameter. Length and diameter are measured in the same method as that described in the first embodiment, and accordingly, the method will not be described repeatedly.

The two CNT assembled wires of sample 1 have lengths of 10 m and 12 m, respectively. The two CNT assembled wires of sample 1 have diameters of Φ0.1 mm and Φ0.08 mm, respectively.

Example 2

As an apparatus 2 is prepared an apparatus for manufacturing a carbon nanotube assembled wire having the same configuration as the FIG. 4 apparatus for manufacturing a carbon nanotube assembled wire. It has a specific configuration as follows:

Apparatus 2 comprises: a carbon nanotube synthesis furnace (an alumina tube having a hollow portion with a diameter of 80 mm (with an area in cross section of 6000 mm$^2$ (having a generally circular cross section)), and a length 2000 mm); a carbon-containing gas supply port provided on one end side of the carbon nanotube synthesis furnace (i.e., on a left side in FIG. 4); a first-1 structure (a first-1A channel, a first-1a channel, a second-1B channel, and a second-1b channel with an area in cross section of 1 mm$^2$, 20 channels (or through holes) in total/inch, and a length of 50 mm) provided on an end side of the carbon nanotube synthesis furnace opposite to the end provided with the carbon-containing gas supply port (i.e., on a right side in FIG. 4); and a first-2 structure (a first-2 channel having a maximum diameter of 30 mm and a length of 1000 mm) and a second-2 structure (a second-2 channel having a maximum diameter of 30 mm and a length of 1000 mm) provided downstream of the first-1 structure. A distance from the end of the CNT synthesis furnace closer to the carbon-containing gas supply port to the end of the first-1 structure closer to the carbon-containing gas supply port is set to 2500 mm. A catalyst (ferrocene) is disposed in the CNT synthesis furnace near the carbon-containing gas supply port. An apparatus for winding CNT assembled wires is disposed downstream of the first-2 structure and the second-2 structure. It is preferable that each channel such as the second-1 channel and the second-2 channel be sucked from upstream toward downstream to efficiently assemble the CNT assembled elemental wires exiting a honeycomb to facilitate assembly.

Apparatus 2 is used to produce a carbon nanotube assembled wire for a sample 2. In apparatus 2, an electric furnace's internal temperature is raised to 1000° C. while an argon gas having an argon gas concentration of 100% by volume is supplied through the carbon-containing gas supply port into the CNT synthesis furnace at a flow rate of 1000 cc/min (flow velocity: 3.4 cm/sec) for 50 minutes. Subsequently, the argon gas is switched to hydrogen gas (4000 cc/min), and ethylene gas is supplied at a flow rate of 200 cc/min (flow velocity: 0.17 cm/sec) and carbon disulfide ($CS_2$) gas is supplied at a flow rate of 4 cc/min (flow velocity: 0.003 cm/sec) for 120 minutes. A gaseous mixture including the hydrogen gas, the ethylene gas, and the carbon disulfide (i.e., the carbon-containing gas) as a whole has a flow velocity of 3.6 cm/sec.

By supplying the hydrogen gas, the ethylene gas, and the carbon disulfide gas, a catalyst is disintegrated and catalyst particles are discharged into the CNT synthesis furnace. Subsequently, CNTs are grown in the CNT synthesis furnace and assembled together inside the first-1 structure to form CNT assembled elemental wires, and the CNT assembled elemental wires are assembled inside each of the first-2 structure and the second-2 structure to form two CNT assembled wires. The CNT assembled wires are wound by the winding apparatus, and two CNT assembled wires are thus collected.

[Measuring Carbon Nanotube Assembled Wire]

(Degree of Orientation)

The two carbon nanotube assembled wires of sample 2 each have its CNTs and CNT assembled elemental wires measured in degree of orientation. Degrees of orientation is calculated in the same method as that described in the first and third embodiments, and accordingly, the method will not be described repeatedly.

The two carbon nanotube assembled wires of sample 2 have their CNTs with degrees of orientation of 0.82 and 0.89, respectively. The two carbon nanotube assembled wires of sample 2 have their CNT assembled elemental wires with degrees of orientation of 0.86 and 0.92, respectively. Thus, it is confirmed that the CNT assembled wires obtained in apparatus 2 have CNTs and CNT assembled elemental wires oriented in their longitudinal direction and thus assembled together.

(Shape)

The two carbon nanotube assembled wires of sample 2 are each measured in length and diameter. Length and diameter are measured in the same method as that described in the first embodiment, and accordingly, the method will not be described repeatedly.

The two CNT assembled wires of sample 2 have lengths of 10 m and 15 m, respectively. The two CNT assembled wires of sample 2 have diameters of 0.8 mm and 1.2 mm, respectively.

Example 3

As an apparatus 3 is prepared an apparatus for manufacturing a carbon nanotube assembled wire having the same configuration as the FIG. 7 apparatus for manufacturing a carbon nanotube assembled wire. It has a specific configuration as follows:

Apparatus 3 comprises: a carbon nanotube synthesis furnace (an alumina tube having a hollow portion with a diameter of Φ50 mm, and a length 1500 mm); a carbon-containing gas supply port provided on one end side of the carbon nanotube synthesis furnace (i.e., on a left side in FIG. 7); a first-3 structure (including a first-1A channel, a first-1a channel, a second-1B channel and a second-1b channel having an area in cross section of 2 $mm^2$, and a first-2 channel and a second-2 channel having an area in cross section of 2 $mm^2$ and each connected to 100 upstream through holes, and having a length of 50 mm, and an upstream major surface with 100 holes and a downstream major surface with 2 holes) provided on an end side of the carbon nanotube synthesis furnace opposite to the end provided with the carbon-containing gas supply port (i.e., on a right side in FIG. 7); and two guiding tubes (having a diameter of 5 mm and a length of 1000 mm) provided downstream of the first-1 structure. A distance from the end of the CNT synthesis furnace closer to the carbon-containing gas supply port to the end of the first-3 structure closer to the carbon-containing gas supply port is set to 2000 mm. A catalyst (ferrocene) is disposed in the CNT synthesis furnace near the carbon-containing gas supply port. An apparatus for winding CNT assembled wires is disposed downstream of the guiding tubes.

Apparatus 3 is used to produce a carbon nanotube assembled wire for a sample 3. In apparatus 3, an electric furnace's internal temperature is raised to 1300° C. while an argon gas having an argon gas concentration of 100% by volume is supplied through the carbon-containing gas supply port into the CNT synthesis furnace at a flow rate of 1000 cc/min (flow velocity: 3.4 cm/sec) for 50 minutes. Subsequently, the argon gas is switched to hydrogen gas (1000 cc/min), and methane gas is supplied at a flow rate of 50 cc/min (flow velocity: 0.17 cm/sec) and carbon disulfide ($CS_2$) gas is supplied at a flow rate of 1 cc/min (flow velocity: 0.003 cm/sec) for 120 minutes. A gaseous mixture including the argon gas, the methane gas, and the carbon disulfide (i.e., the carbon-containing gas) as a whole has a flow velocity of 3.6 cm/sec.

By supplying the hydrogen gas, the methane gas, and the carbon disulfide gas, a catalyst is disintegrated and catalyst particles are discharged into the CNT synthesis furnace. Subsequently, CNTs are grown in the CNT synthesis furnace, and assembled together in the first-3 structure to form two CNT assembled wires, and the CNT assembled wires enter the guiding tubes. The CNT assembled wires are wound by the winding apparatus, and two CNT assembled wires are thus collected.

[Measuring Carbon Nanotube Assembled Wire]

(Degree of Orientation)

The two carbon nanotube assembled wires of sample 3 each have its CNTs and CNT assembled elemental wires measured in degree of orientation. Degrees of orientation is calculated in the same method as that described in the first and third embodiments, and accordingly, the method will not be described repeatedly.

The two carbon nanotube assembled wires of sample 3 have their CNTs with degrees of orientation of 0.86 and 0.93, respectively. The two carbon nanotube assembled wires of sample 3 have their CNT assembled elemental wires with degrees of orientation of 0.87 and 0.91, respectively. Thus, it is confirmed that the CNT assembled wires obtained in apparatus 3 have CNTs and CNT assembled elemental wires oriented in their longitudinal direction and thus assembled together.

(Shape)

The two carbon nanotube assembled wires of sample 3 are each measured in length and diameter. Length and diameter are measured in the same method as that described in the first embodiment, and accordingly, the method will not be described repeatedly.

The two CNT assembled wires of sample 3 have lengths of 100 m and 150 m, respectively. The two CNT assembled wires of sample 3 have diameters of 0.2 mm and 0.3 mm, respectively.

Comparative Example 1

Figure 11:
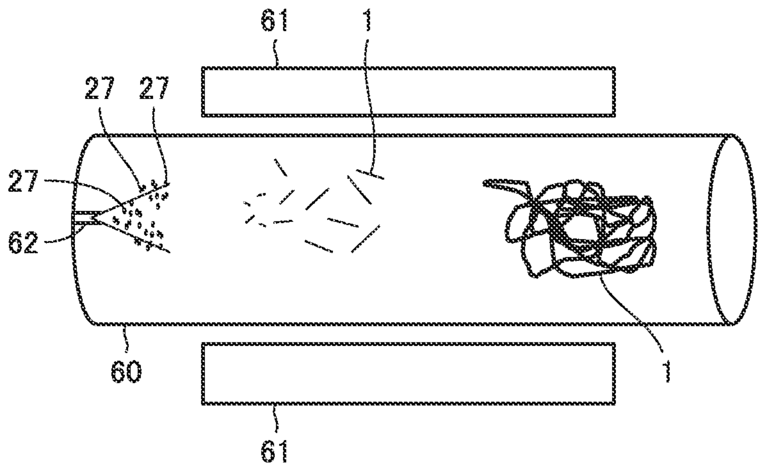
FIG. 11 shows an apparatus 4 (an apparatus for manufacturing a carbon nanotube assembled wire according to a comparative example).

An apparatus having the configuration shown in FIG. 11 is prepared as an apparatus 4. Apparatus 4 basically has the same configuration as apparatus 1 except that the former excludes the first channel, the second channel, and the winding apparatus.

When apparatus 4 is used to synthesize CNT assembled wires under the same conditions as those for the first embodiment, the CNT assembled wires are entangled in the CNT synthesis furnace without orientation, and CNT assembled wires with CNTs oriented in the longitudinal direction and thus assembled together cannot be formed.

Comparative Example 2

As an apparatus 5 is prepared an apparatus basically having the same configuration as apparatus 2 except that the former excludes the first-2 structure, the second-2 structure, and the winding apparatus.

Figure 12:
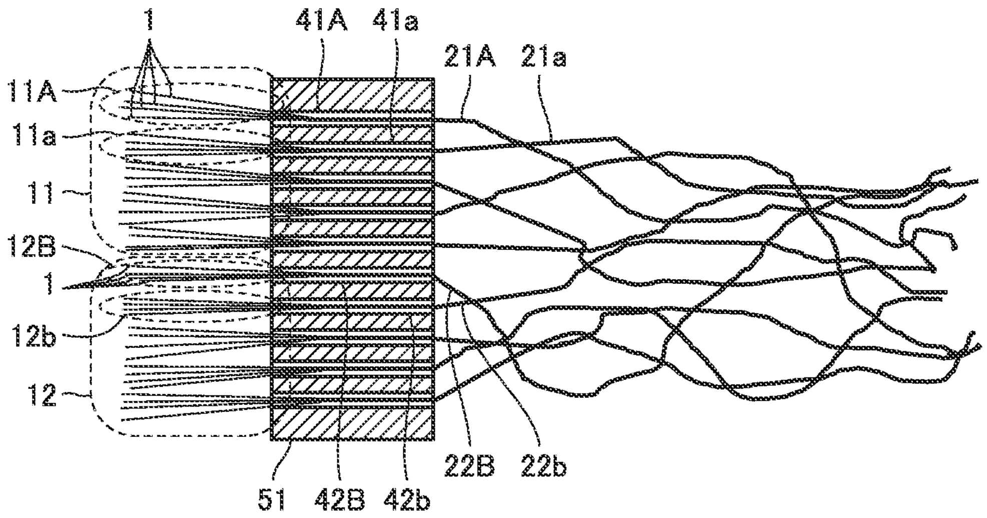
FIG. 12 shows a cross section of the first-1 structure of an apparatus 5 (an apparatus for manufacturing a carbon nanotube assembled wire according to a comparative example).

When apparatus 5 is used to synthesize CNT assembled elemental wires under the same conditions as those for the second embodiment, a plurality of CNT assembled elemental wires discharged from the first-1 structure are entangled with one another without orientation, as shown in FIG. 12, and CNT assembled wires with CNT assembled elemental wires oriented in the longitudinal direction and thus assembled together cannot be obtained.

While embodiments and examples of the present disclosure have been described as above, it is also planned from the beginning that the configurations of the above-described embodiments and examples are appropriately combined and variously modified.

The presently disclosed embodiments and examples are illustrative in any respects and should not be construed as being restrictive. The scope of the present invention is defined by the scope of the claims, rather than the embodiments and the examples described above, and is intended to include any modifications within the scope and meaning equivalent to the scope of the claims.

REFERENCE SIGNS LIST

1 carbon nanotube, 11 first carbon nanotube group, 11A first A carbon nanotube group, 11*a* first a carbon nanotube group, 12 second carbon nanotube group, 12B second B carbon nanotube group, 12*b* second b carbon nanotube group, 21A first A carbon nanotube assembled elemental wire, 21*a* first a carbon nanotube assembled elemental wire, 22B second B carbon nanotube assembled elemental wire, 22*b* second b carbon nanotube assembled elemental wire, 27 catalyst particle, 31 first carbon nanotube assembled wire, 32 second carbon nanotube assembled wire, 40A first A structure, 40A-1 first A-1 portion, 40A-2 first A-2 portion, 40B first B structure, 40B-1 first B-1 portion, 40B-2 first B-2 portion, 41 first channel, 41A first-1A channel, 41*a* first-1a channel, 41C first-2 channel, 42 second channel, 42B second-1B channel, 42*b* second-1b channel, 42D second-2 channel, 51 first-1 structure, 52A first-2 structure, 52B second-2 structure, 53 first-3 structure, 60 carbon nanotube synthesis furnace, 61 heating device, 62 carbon-containing gas supply port, 63 liquid adhering apparatus, 64 winding apparatus, 65 guiding tube, 100*a*, 100*b*, and 100*c* apparatus for manufacturing carbon nanotube assembled wire.

The invention claimed is:

1. A method for manufacturing a carbon nanotube assembled wire comprising:

a first step of supplying a carbon-containing gas to a plurality of catalyst particles in a suspended state in a tubular carbon nanotube synthesis furnace to grow a carbon nanotube from each of the plurality of catalyst particles to obtain a plurality of carbon nanotubes; and a second step of assembling the plurality of carbon nanotubes together to obtain a plurality of carbon nanotube assembled wires, the second step including a second A step of orienting a first carbon nanotube group composed of some of the plurality of carbon nanotubes in a longitudinal direction of the carbon nanotubes in a first channel that includes a first funnel-shaped portion connected to an end of the first channel and thus assembling the first carbon nanotube group to obtain a first carbon nanotube assembled wire, and a second B step of orienting a second carbon nanotube group composed of some of the plurality of carbon nanotubes different from the plurality of carbon nanotubes composing the first carbon nanotube group in a longitudinal direction of the carbon nanotubes in a second channel that includes a second funnel-shaped portion connected to an end of the first channel and thus assembling the second carbon nanotube group to obtain a second carbon nanotube assembled wire.

2. The method for manufacturing a carbon nanotube assembled wire according to claim 1, wherein the first carbon nanotube group includes a first A carbon nanotube group composed of some of the plurality of carbon nanotubes composing the first carbon nanotube group, and a first a carbon nanotube group composed of some of the plurality of carbon nanotubes composing the first carbon nanotube group different from the plurality of carbon nanotubes composing the first A carbon nanotube group, the first channel includes a first-1A channel and a first-1a channel provided in parallel in a longitudinal direction of the carbon nanotube synthesis furnace, and a first-2 channel provided downstream of the first-1A channel and the first-1a channel as seen along a flow of the carbon-containing gas, the second A step includes a second A-1A step of orienting the first A carbon nanotube group in the first-1A channel in a longitudinal direction of the carbon nanotubes and thus assembling the group to obtain a first A carbon nanotube assembled elemental wire, a second A-1a step of orienting the first a carbon nanotube group in the first-1a channel in the longitudinal direction of the carbon nanotubes and thus assembling the group to obtain a first a carbon nanotube assembled elemental wire, and a second A-2 step of orienting a plurality of carbon nanotube assembled elemental wires including the first A carbon nanotube assembled elemental wire and the first a carbon nanotube assembled elemental wire in the first-2 channel in a longitudinal direction of the carbon nanotube assembled elemental wires and thus assembling the plurality of carbon nanotube assembled elemental wires together to obtain the first carbon nanotube assembled wire, the second carbon nanotube group includes a second B carbon nanotube group composed of some of a plurality of carbon nanotubes composing the second carbon nanotube group, and a second b carbon nanotube group composed of some of the plurality of carbon nanotubes composing the second carbon nanotube group different from the plurality of carbon nanotubes composing the second B carbon nanotube group, the second channel includes a second-1B channel and a second-1b channel provided in parallel in the longitudinal direction of the carbon nanotube synthesis furnace, and a second-2 channel provided downstream of the second-1B channel and the second-1b channel as seen along the flow of the carbon-containing gas, the second B step includes a second B-1B step of orienting the second B carbon nanotube group in the second-1B channel in a longitudinal direction of the carbon nanotubes and thus assembling the group to obtain a second B carbon nanotube assembled elemental wire, a second B-1b step of orienting the second b carbon nanotube group in the second-1b channel in the longitudinal direction of the carbon nanotubes and thus assembling the group to obtain a second b carbon nanotube assembled elemental wire, and a second B-2 step of orienting a plurality of carbon nanotube assembled elemental wires including the second B carbon nanotube assembled elemental wire and the second b carbon nanotube assembled elemental wire in the second-2 channel in a longitudinal direction of the carbon nanotube assembled elemental wires and thus assembling the plurality of carbon nanotube assembled elemental wires together to obtain the second carbon nanotube assembled wire.

3. An apparatus for manufacturing a carbon nanotube assembled wire, comprising:

a tubular carbon nanotube synthesis furnace;

a carbon-containing gas supply port provided on one end side of the carbon nanotube synthesis furnace;

a first channel and a second channel provided on an end side of the carbon nanotube synthesis furnace opposite to the end provided with the carbon-containing gas supply port;

a first funnel-shaped portion connected to an end of the first channel; and a second funnel-shaped portion connected to an end of the first channel; wherein the first channel and the second channel are provided in parallel in a longitudinal direction of the carbon nanotube synthesis furnace and the first channel and the second channel each have a cross-sectional area smaller than a cross-sectional area of the carbon nanotube synthesis furnace.

4. The apparatus for manufacturing a carbon nanotube assembled wire according to claim 3, wherein the first channel includes a first-1A channel and a first-1a channel provided in parallel in the carbon nanotube synthesis furnace on a side closer to the carbon-containing gas supply port, and a first-2 channel provided on a side of the first-1A channel and the first-1a channel farther away from the carbon-containing gas supply port, and the second channel includes a second-1B channel and a second-1b channel provided in parallel in the carbon nanotube synthesis furnace on a side closer to the carbon-containing gas supply port, and a second-2 channel provided on a side of the second-1B channel and the second-1b channel farther away from the carbon-containing gas supply port.

5. The apparatus for manufacturing a carbon nanotube assembled wire according to claim 4, wherein the first-1A channel, the first-1a channel, the second-1B channel, and the second-1b channel are provided to a single, first-1 structure, the first-2 channel is provided to a first-2 structure different from the first-1 structure, and the second-2 channel is provided to a second-2 structure different from the first-1 structure.

6. The apparatus for manufacturing a carbon nanotube assembled wire according to claim 4, wherein the first-1A channel, the first-1a channel, the first-2 channel, the second-1B channel, the second-1b channel, and the second-2 channel are provided to a single, first-3 structure, an end of each of the first-1A channel and the first-1a channel farther away from the carbon-containing gas supply port is connected to an end of the first-2 channel closer to the carbon-containing gas supply port, and an end of each of the second-1B channel and the second-1b channel farther away from the carbon-containing gas supply port is connected to an end of the second-2 channel closer to the carbon-containing gas supply port.

7. The apparatus for manufacturing a carbon nanotube assembled wire according to claim 3, wherein the funnel-shaped portions are inside the carbon nanotube synthesis furnace.

8. The method for manufacturing a carbon nanotube assembled wire according to claim 1, wherein the funnel-shaped portions are inside the carbon nanotube synthesis furnace.

* * * * *